(12) United States Patent
Kojima et al.

(10) Patent No.: US 6,766,016 B2
(45) Date of Patent: Jul. 20, 2004

(54) SUPERVISORY CONTROL SYSTEM

(75) Inventors: Susumu Kojima, Kawasaki (JP); Gaku Todokoro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 315 days.

(21) Appl. No.: 10/135,018

(22) Filed: Apr. 25, 2002

(65) Prior Publication Data

US 2002/0126809 A1 Sep. 12, 2002

Related U.S. Application Data

(63) Continuation of application No. PCT/JP99/06109, filed on Nov. 2, 1999.

(51) Int. Cl.[7] .................. H04M 1/00; H04M 15/00; H04M 1/24
(52) U.S. Cl. .................. 379/350; 379/9.03; 379/112.01
(58) Field of Search ............. 379/111, 112.01, 379/112.02, 112.04, 112.05, 112.1, 9.03, 9.04, 29.09, 29.1, 14.01, 350, 351, 379

(56) References Cited

U.S. PATENT DOCUMENTS 6,580,898 B1 * 6/2003 Oguri .................. 455/8

FOREIGN PATENT DOCUMENTS

| JP | 03-108836 | 5/1991 |
|----|-----------|--------|
| JP | 05-313952 | 11/1993 |
| JP | 08-288945 | 11/1996 |
| JP | 10-107791 | 4/1998 |
| JP | 10-340211 | 12/1998 |
| JP | 11-122260 | 4/1999 |

* cited by examiner

Primary Examiner—Rexford Barnie
(74) Attorney, Agent, or Firm—Katten Muchin Zavis Rosenman

(57) ABSTRACT

In a supervisory control system where an upper supervisory control terminal supervises and controls transmitting devices, the upper supervisory control terminal has two supervisory states. The transmitting devices store state change information to be transmitted to the upper supervisory control terminal with an issue of the information being suppressed when the upper supervisory control terminal is in one supervisory state, and merge the state change information into a single message to be transmitted when the upper supervisory control terminal shifts to the other supervisory state.

9 Claims, 25 Drawing Sheets

| GENERATION NE | GENERATED ALARM TYPE | GENERATED POSITION | GENERATED DATE & TIME | RECOVERED DATE & TIME |
|---|---|---|---|---|
| TOKYO001 | DCCFAIL | 1-P | 1999/5/21 21:05 | 1999/5/21 22:11 |
| OSAKA0001 | LOS | 3-W | 1999/7/20 01:00 | 1999/7/20 03:45 |
| | | | | |

| NE ID | NOTIFICATION FLAG |
|---|---|
| TOKYO001 | |
| YOKOHAMA001 | |
| OSAKA001 | |

| ALARM TYPE | GENERATED POSITION | GENERATION FLAG | ADDRESS POINTER TO STATE CHANGE STORING TABLE |
|---|---|---|---|
| AIS | 1-P | | |
| AIS | 2-P | | |
| AIS | 3-W | | |
| : | : | | |
| UNEQ | 6-3-H1 | | |
| UNEQ | 6-3-H2 | | |

| ADDRESS | GENERATED ALARM TYPE | GENERATED POSITION | GENERATED DATE & TIME | RECOVERED DATE & TIME |
|---|---|---|---|---|
| 1 | DCCFAIL | | 1999/220 21:05 | 1999/220 22:11 |
| 2 | LOS | | 1999/8/9 01:00 | 1999/8/9 03:45 |
| 3 | | | | |

| 42 |
|---|
| NE ID |
| TOKYO001 |
| YOKOHAMA001 |
| OSAKA001 |

| ADDRESS | GENERATED ALARM TYPE | GENERATED POSITION | GENERATED DATE & TIME | RECOVERED DATE & TIME | PRIORITY FLAG |
|---|---|---|---|---|---|
| 1 | DCCFAIL | | 1999/220 21:05 | 1999/220 22:11 | |
| 2 | LOS | | 1999/8/9 01:00 | 1999/8/9 03:45 | |
| 3 | | | | | |

SUPERVISORY CONTROL SYSTEM

This is a Continuation of PCT/JP99/06109 filed Nov. 2, 1999.

BACKGROUND OF THE INVENTION

1. Field of the Invention

The present invention relates to a supervisory control system, and in particular to a supervisory control system where an upper supervisory control terminal supervises and controls transmitting devices.

In a supervisory control system where an upper supervisory control terminal (OPS) and a plurality of transmitting devices (NE's) communicate with LAN, DCC, or the like, it is required that an operator on the side of the upper supervisory control terminal recognizes states of the transmitting devices.

2. Description of the Related Art

Following two systems have been previously used for a system where an upper supervisory control terminal supervises transmitting devices through communication lines.

(1) As shown in FIG. 32, this is a system where when two transmitting devices NE1 and NE2, for example, are connected to an upper supervisory control terminal OPS with a communication line, the transmitting device NE1 sequentially notifies to the upper supervisory control terminal OPS state changes, i.e. a generation of an alarm A (501), a generation of an alarm B (502), a generation of an alarm C (503), a recovery of the alarm C (504), and a recovery of the alarm A (505). Similarly, the transmitting device NE2 sequentially notifies to the upper supervisory control terminal OPS a generation of an alarm D (506) and a generation of an alarm E (507). Namely, in such a supervisory control system, every time a state change occurs, the transmitting device issues a notification of the state change to the upper supervisory control terminal OPS in real time.

(2) As shown in FIG. 33, this is a system where the upper supervisory control terminal OPS reads the respective states of the transmitting devices NE1 and NE2. First, the upper supervisory control terminal OPS issues an alarm read (601) to the transmitting devices NE1 and NE2. In response, the transmitting device NE1 issues a notification (602) indicating that there is no alarm presently generated to the upper supervisory control terminal OPS. The transmitting device NE2 issues a notification (603) indicating that alarms D and E are being generated to the upper supervisory control terminal OPS.

Then, in the transmitting device NE1, a generation of an alarm A (604), a generation of an alarm B (605), a generation of an alarm C (606), a recovery of the alarm C (607), and a recovery of the alarm A (608) occur in the form of state changes. In the transmitting device NE2, a recovery of the alarm D (611) occurs in the form of a state change.

Hereafter, when an alarm read (609) is provided to the transmitting devices NE1 and NE2 from the upper supervisory control terminal OPS, a notification (610) indicating that the alarm B is being generated is issued from the transmitting device NE1 to the upper supervisory control terminal OPS, and a notification (612) indicating that the alarm E is being generated is issued from the transmitting device NE2 to the upper supervisory control terminal OPS.

Thus, a state read command is transmitted to the transmitting devices as required from the upper supervisory control terminal, and the transmitting device having received the read command notifies its own state change.

However, there were respective problems as follows in such prior art:

(1) When an alarm generation and an alarm recovery are repeated for a short time, so that many notifications (telegrams) frequently arise from the transmitting devices, the communication between the transmitting devices and the upper supervisory control terminal is congested.

(2) Faults generated may not be dealt with such that the upper supervisory control terminal can recognize only a present state of the transmitting devices at the time of reading, and an operator neither can determine whether or not the state of the transmitting devices has been changed in the meantime, nor can recognize alarms generated and recovered particularly before reading the state.

SUMMARY OF THE INVENTION

It is accordingly an object of the present invention to provide a supervisory control system where an upper supervisory control terminal supervises and controls transmitting devices, a congestion state of a communication line is reduced, and a state change having occurred can be accurately notified to the upper supervisory control terminal.

[1] In order to achieve the above-mentioned object, in a supervisory control system of claim 1 according to the present invention, an upper supervisory control terminal has two supervisory states, transmitting devices store state change information to be transmitted to the upper supervisory control terminal when the upper supervisory control terminal is in one supervisory state, and merge the state change information into a single message to be transmitted when the upper supervisory control terminal shifts to the other supervisory state.

Namely, in the present invention, an upper supervisory control terminal has a switchover function of supervisory states, and transitions between two supervisory states of a real time supervision and a non-real time supervision according to a supervisory state of an operator.

A transmitting device has a state (issue state) of notifying a state change in real time, and a state (issue suppression state) of not notifying a state change. Each transmitting device has a function of storing state changes during an issue suppression state period and of merging the stored state changes into a single message to be notified to the upper supervisory control terminal.

Such a technical concept will be described referring to an arrangement and an operation example of FIG. 1.

It is hereby supposed that an operator is located on the side of an upper supervisory control terminal OPS, and e.g. five transmitting devices NE1–NE5 are connected, through communication lines, to the upper supervisory control terminal OPS.

The upper supervisory control terminal OPS is firstly in the real time supervisory state, and supervises states (101–105) of the transmitting devices NE1–NE5. In the example of FIG. 1, the transmitting device NE1 is in a state (101) of no alarm being generated (no alarm generation). The transmitting device NE2 is similarly in a state (102) of no alarm generation. Also, the transmitting device NE3 is in a state (103) of an alarm F being generated (continuing alarm). The transmitting device NE4 is in a state (104) of continuing alarms G and H. The transmitting device NE5 is in a state (106) of no alarm generation.

If the operator performs a switchover (106) to the non-real time supervisory state with respect to the upper supervisory control terminal OPS, the upper supervisory control terminal OPS performs a suppression setting (107) of a state change notification to all of the transmitting devices NE1–NE5 to be supervised concurrently with the switchover (106) (claim 2).

Until the operator again executes a switchover (118) in order to perform the real time supervision and the upper supervisory control terminal OPS executes a suppression release (119), the transmitting devices NE1–NE5 preliminarily store the state changes respectively in e.g. a database.

Namely, in the example of FIG. 1, only notifications (108, 110, and 109) of the first state changes can be performed after the issue suppression (107) is set in the transmitting devices NE1–NE5, and the following state changes are stored in the database or the like (claim 3).

After the generation of the alarm A is notified (108) in the transmitting device NE1, as shown by a state change ① of a dotted line part, a generation (111) of an alarm B, a generation (112) of an alarm C, a recovery (113) of the alarm C, and a recovery (114) of the alarm A are stored in the database or the like. Also in the transmitting device NE2, after a generation of an alarm D is notified (110), as shown by a state change ② of the dotted line part, a generation (115) of an alarm E is stored in the database or the like. Furthermore, in the transmitting device NE4, after the recovery of the alarm G is notified (109), as shown in a state change ③ of the dotted line part, a recovery (116) of the alarm H and a generation (117) of the alarm G are stored in the database or the like. As for the transmitting devices NE3 and NE5, since no state change occurs, there is no particular information to be stored in the database.

Thus, after storing the state changes ①–③ in the database or the like, the upper supervisory control terminal OPS performs the suppression release (119) based on the switchover (118) by the operator, and executes a state read (120) for the transmitting devices NE1–NE5.

However, since the generation and the recovery of the alarm are notified only to the transmitting devices NE1, NE2, and NE4 in this case, as mentioned above, the upper supervisory control terminal OPS has only to execute the state read (120) to these transmitting devices NE1, NE2, and NE4 (claim 4).

The transmitting devices NE1, NE2, and NE4 having received the command of the state read (120) transmit state changes during the suppression in the form of a single message.

Namely, the transmitting device NE1 makes a notification (121) of the state change ①, the transmitting device NE2 makes a notification (122) of the state change ②, and the transmitting device NE4 makes a notification (123) of the state change ③.

The upper supervisory control terminal OPS stores the received state changes ①–③ during the suppression period in e.g. an alarm database to return to the real time supervisory state for the transmitting devices.

Namely, the transmitting device NE1 assumes a state (124) of continuing the alarm B, the transmitting device NE2 assumes a state (125) of continuing the alarms D and E, the transmitting device NE3 assumes a state (126) of continuing the alarm F, the transmitting device NE4 assumes a state (127) of continuing the alarm H, and the transmitting device NE5 assumes a state (128) of no alarm generation, so that these states are supervised in real time.

Thus, it becomes possible to decrease the number of messages issued to the upper supervisory control terminal from the transmitting devices. Also, the upper supervisory control terminal and the transmitting devices have a control function concerning the notification during the suppression so that the first state change may be notified from the transmitting devices within a supervisory network, even after the upper supervisory control terminal and the transmitting devices assume the non-real time supervisory state. Therefore, it becomes possible to recognize the state change within the supervisory network even if an operator does not read a state one by one.

[2] In the supervisory control system of claim 5 according to the present invention, as in the above-mentioned principle [1], the upper supervisory control terminal has two supervisory states, and as for the processing from the issue suppression of the state change information in transmitting devices to the suppression release, on condition that the upper supervisory control terminal autonomously receives the first state change information from any transmitting device after an operator switches over the supervisory state of the upper supervisory control terminal, the state change from the issue suppression setting to its suppression release may be stored in the database or the like, as shown in the above-mentioned principle [1].

This will be described by the example of FIG. 2. It is supposed that the transmitting devices NE1–NE5 are firstly in a real time supervisory state corresponding to the states (101–105) shown in FIG. 1.

If the operator instructs the upper supervisory control terminal OPS a switchover (206) to the non-real time supervisory state in such a real time supervisory state, the upper supervisory control terminal OPS, different from the case in FIG. 1, does not immediately set the issue suppression in the transmitting devices NE1–NE5.

Thereafter, a state change (generation of alarm A) occurs in a certain transmitting device within the network, in the transmitting device NE1 in this case, so that a state change notification (207) is provided to the upper supervisory control terminal OPS.

The upper supervisory control terminal OPS having received this notification (207) performs a suppression setting (208) of the state notification to all of the transmitting devices NE1–NE5 to be supervised.

After this issue suppression setting (208), none of the transmitting devices NE1–NE5 issues the state change notifications, so that these state changes are stored in the database or the like.

In the example of FIG. 2, a state change ④ substantially corresponding to the state change ① shown in FIG. 1 is stored in the database or the like in the transmitting device NE1. In the transmitting device NE2, a generation (213) of the alarm D and a generation (214) of the alarm E are stored in the database or the like in the form of a state change ⑤. In the transmitting device NE4, a recovery (215) of the alarm G, a recovery (216) of the alarm H, and a generation (217) of the alarm G are stored in the database or the like in the form of a state change ⑥.

If the operator again performs a state switchover (218) of the upper supervisory control terminal OPS for performing the real time supervision setting, the upper supervisory control terminal OPS transmits, concurrently with the switchover (218), a command of a suppression release (209) to all of the transmitting devices NE1–NE5, and transmits a command of a state read (220) for reading state changes ④–⑥ from the issue suppression (208) to the suppression release (209).

In this case, it is unknown what state changes are occurring in the transmitting devices. Therefore, it is preferable for the upper supervisory control terminal OPS to read the state change information during the issue suppression period from all of the transmitting devices to be supervised (claim 6).

As a result, the transmitting devices NE1–NE5 having received the command of the read (220) make notifications (221–225) of the state changes during the suppression period in the form of a single message.

The upper supervisory control terminal OPS stores the received state changes during the issue suppression period in e.g. an alarm history database to return to the real time supervisory state. Real time supervisory states (226–230) in this case correspond to the states (124–128) shown in FIG. 1 for the transmitting devices NE1–NE5 in the upper supervisory control terminal OPS.

[3] In the supervisory control system of claim 7 according to the present invention, in either of the above-mentioned principles [1] and [2], concurrently with the issue suppression to the transmitting devices being released from the upper supervisory control terminal, the transmitting devices autonomously notify the state change information stored during an issue suppression period.

This will be described referring to FIG. 3. After the upper supervisory control terminal OPS provides an issue suppression terminal (301) to the transmitting devices NE1 and NE2, a state change ⑦ (302–305) is stored in the database or the like in the form of the state change information as mentioned above in the transmitting device NE1. Thereafter, when an issue suppression release (306) is provided to the transmitting devices NE1 and NE2, the transmitting device NE1 no sooner receives the command than 5autonomously notifies (307) the above-mentioned state change ⑦ even if there is no read command. Since storing no state change information in this case, the transmitting device NE2 does not perform an autonomous notification.

[4] In the supervisory control system of claim 8 according to the present invention, in any one of the above-mentioned principles [1]–[3], messages stored during the issue suppression period are separated according to a priority to be notified.

This will be described referring to FIG. 4. First, the upper supervisory control terminal OPS executes an issue suppression (401) to the transmitting device NE.

Based on this, the transmitting device NE stores a state change (402) of the alarm generation, the alarm recovery, or the like during the suppression period in the database or the like.

The operator switches over the supervisory state of the upper supervisory control terminal OPS, so that an issue suppression release (403) from the upper supervisory control terminal OPS for the transmitting device NE is set. If a command of a state read (404) is further transmitted, the transmitting device NE firstly makes a notification (405) of an alarm with a priority generated or recovered during the issue suppression. Then, the transmitting device NE makes a notification (406) of an alarm with a lower priority generated and recovered during the issue suppression.

It is to be noted that as an example the above-mentioned one supervisory state comprises a non-real time supervisory state, and the other supervisory state comprises a real time supervisory state (claim 9).

BRIEF DESCRIPTION OF THE DRAWINGS

The above and other objects and advantages of the invention will be apparent upon consideration of the following detailed description, taken in conjunction with the accompanying drawings, in which the reference numbers refer to like parts throughout and in which:

FIG. 6 is a diagram showing an embodiment of an alarm history storing table used in FIG. 5;

FIG. 7 is a diagram showing an embodiment of an NE management table used in FIG. 5;

FIG. 8 is a diagram showing an embodiment of an information management table used in FIG. 5;

FIG. 9 is a diagram showing an embodiment of a state change storing table used in FIG. 5;

FIG. 19 is a flow chart at the time when each transmitting device stores a state change in a database or the like;

DESCRIPTION OF THE EMBODIMENTS

Figure 1:
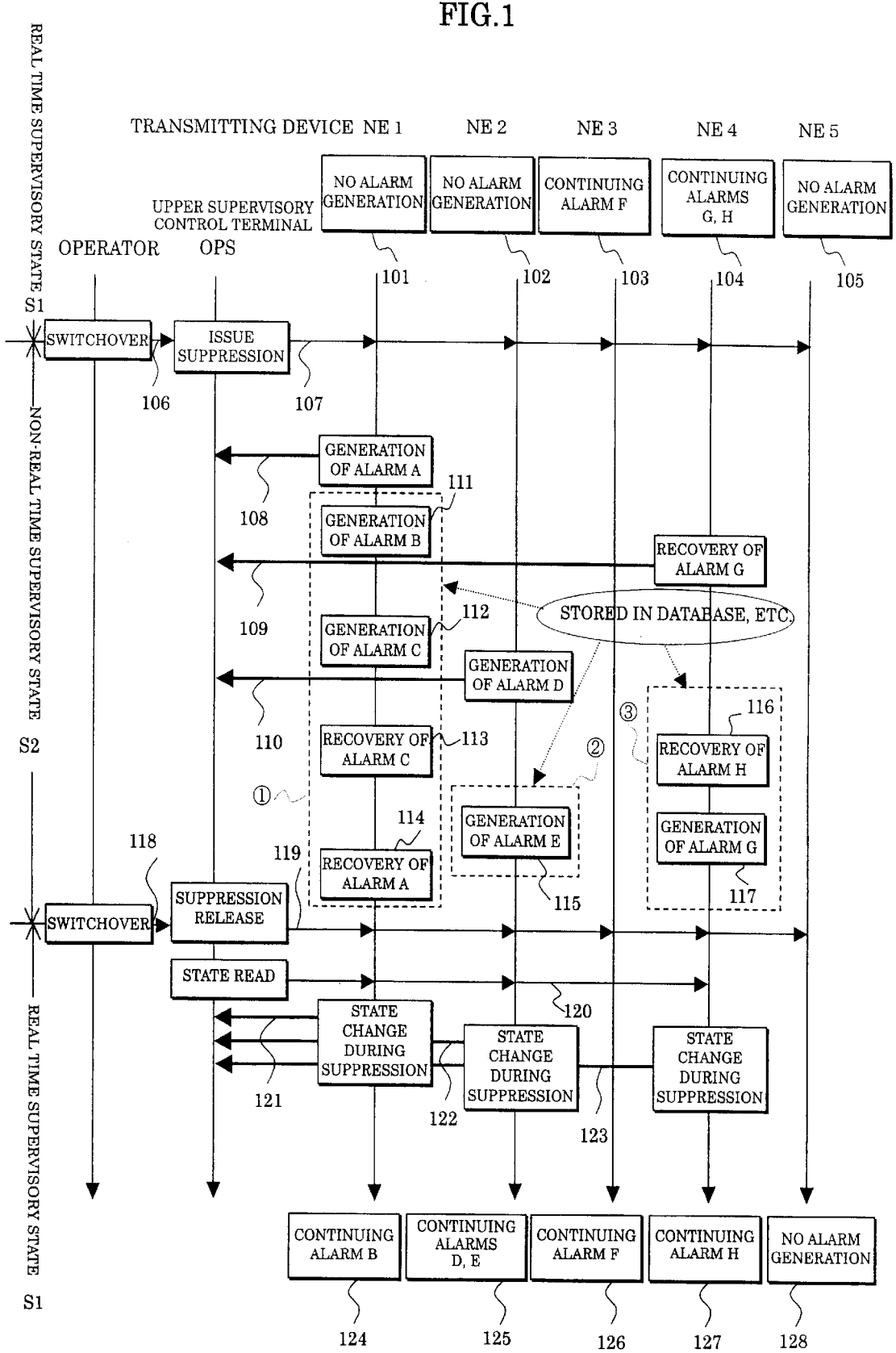
FIG. 1 is a sequence diagram for illustrating a principle [1] of a supervisory control system according to the present invention.
Figure 5:
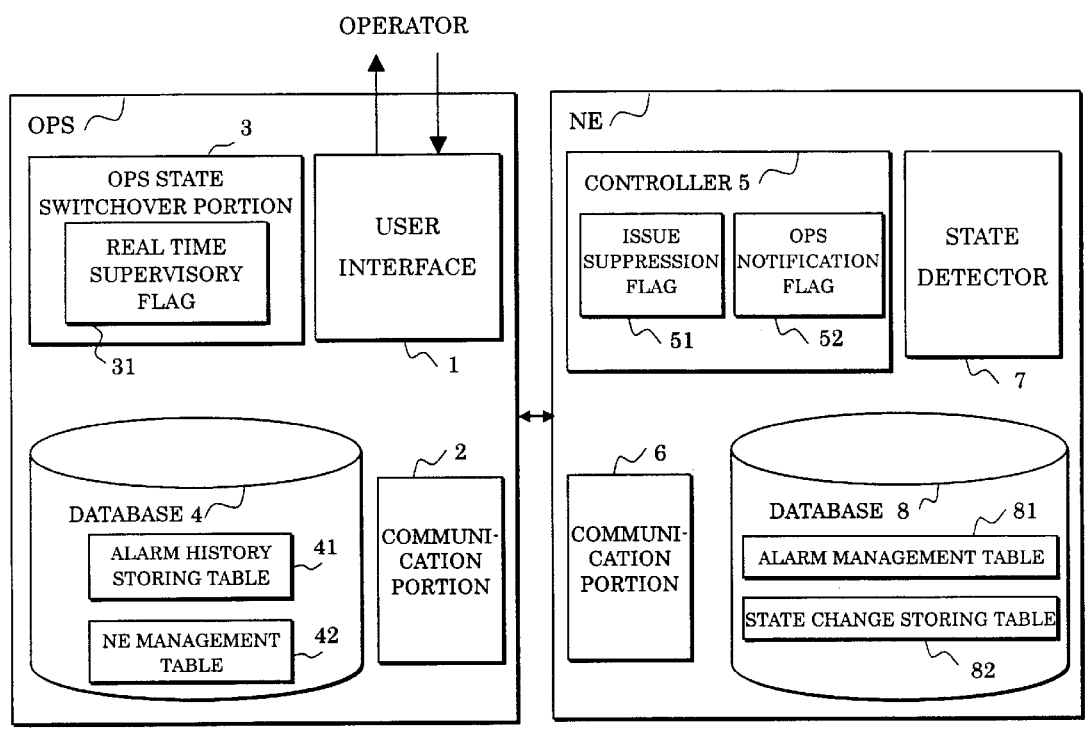
FIG. 5 is a block diagram showing an embodiment in which a principle [1] of a supervisory control system according to the present invention is realized.

FIG. 5 shows an embodiment for realizing a principle [1] (claims 1–4) of a supervisory control system according to the present invention shown in FIG. 1. In this embodiment, the upper supervisory control terminal OPS is composed of a user interface 1, a communication portion 2, an OPS state switchover portion 3, and a database 4.

The user interface 1 undertakes an interface control between an operator and the upper supervisory control terminal OPS such as an indication of an alarm to the operator and an operator's input. The communication portion 2 governs a communication control with a transmitting device such as a transmission of a control command to each transmitting device NE, and a reception of an autonomous notification and a response message from each transmitting device NE. The OPS state switchover portion 3 has a real time supervisory flag 31 and controls a transition of a supervisory state of the upper supervisory control terminal OPS with this flag 31.

Also, an alarm history storing table 41 and an NE management table 42 are provided to the database 4. Among these, the alarm history storing table 41 is composed of, as shown in FIG. 6, a generated alarm type, a generated position, a generated date & time, and a recovered date & time concerning a transmitting device where an alarm has been generated, so that a past state change of the transmitting device can be referred.

Also, the NE management table 42 is composed of, as shown in FIG. 7, an NE ID (transmitting device identifier) and a notification flag, and manages all of the transmitting devices that are supervision objects of the upper supervisory control terminal OPS. The notification flag is used for distinguishing a transmitting device having given a state change notification during a suppression period.

On the other hand, each transmitting device NE is composed of a controller 5, a communication portion 6, a state detector 7, and a database 8. The controller 5 has an issue suppression flag 51 and an OPS notification flag 52, and controls an autonomous notification with these flags. Also, the communication portion 6 governs a communication control with the upper supervisory control terminal OPS such as a control command reception from the upper supervisory control terminal OPS and an issue of an autonomous notification and a response message. Also, the state detector 7 detects an alarm state of a hardware. Furthermore, an alarm management table 81 and a state change storing table 82 are provided in the database 8.

The alarm management table 81 is composed of, as shown in FIG. 8, an alarm type, a generated position, a generated flag, and an address pointer to the state change storing table 82. Also, the state change storing table 82 is composed of, as shown in FIG. 9, an address, a generated alarm type, a generated position, a generated date & time, and a recovered date & time.

Hereinafter, the operation of such an embodiment will be described referring to FIGS. 1 and 10–20.

First, the operation of the upper supervisory control terminal OPS will be described.

Figure 10:
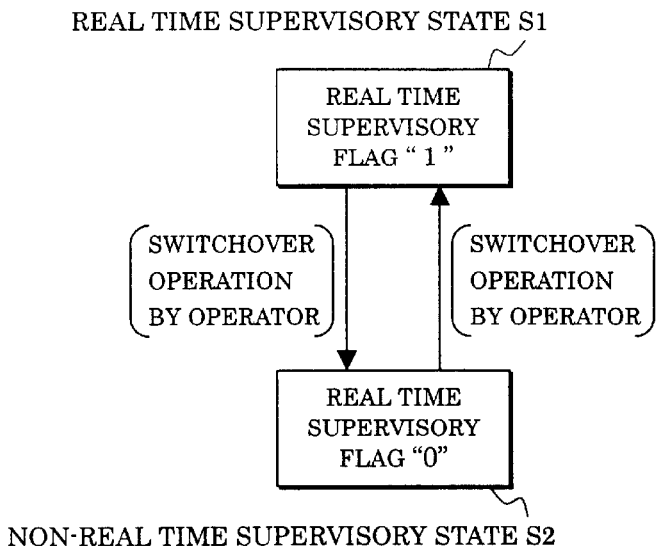
FIG. 10 is a state transition diagram of an upper supervisory control terminal used in the principle [1] of a supervisory control system according to the present invention.

FIG. 10 shows a state transition of the upper supervisory control terminal OPS, which has two supervisory states; a real time supervision and a non-real time supervision. The value of the real time supervisory flag 31 is "1" in a real time supervisory state S1, and its value is "0" in a non-real time supervisory state S2. The state transitions by the operations (106 and 118 in FIG. 1) of the operator through the user interface 1.

Figure 11:
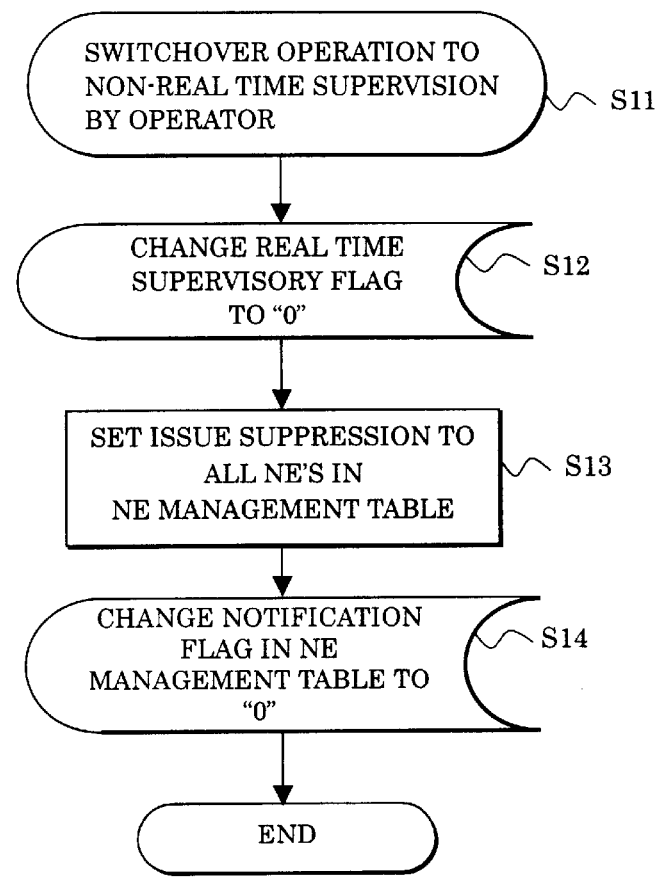
FIG. 11 is a flow chart (1) at the time when an operator performs a switchover operation from a real time supervisory state to a non-real time supervisory state in the principle [1] of a supervisory control system according to the present invention.

FIG. 11 shows a processing flow of the upper supervisory control terminal OPS at the time when the operator performs the switchover operation (106 in FIG. 1). When the operation of the operator switches over the upper supervisory control terminal OPS from the real time supervisory state S1 to the non-real time supervisory state S2 (at step S11), the real time supervisory flag 31 is changed to "0" (at step S12), the setting of the issue suppression (107 in FIG. 1) is performed by the communication portion 2 to all of the transmitting devices NE's in the NE management table 42 (at step S13), and the notification flag in the NE management table 42 is set to "0" (at step S14).

Figure 12:
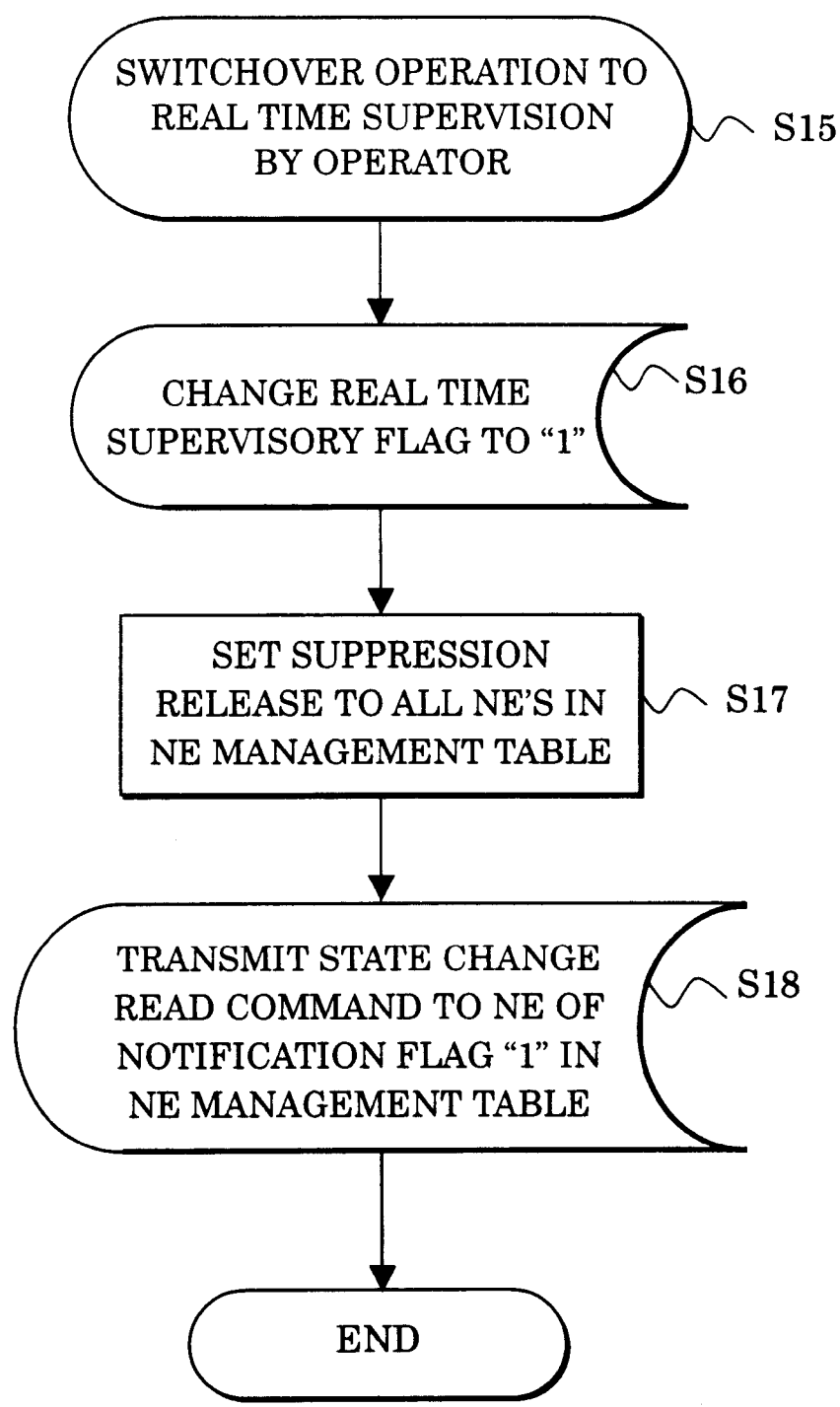
FIG. 12 is a flow chart (2) at the time when an operator performs a switchover operation from a non-real time supervisory state to a real time supervisory state in the principle [1] of a supervisory control system according to the present invention.

FIG. 12 shows a processing example at the time when the non-real time supervisory state S2 of FIG. 11 is returned to the real time supervisory state S1. When the operation of the operator (118 in FIG. 1) returns the state to the real time supervisory state S1 (at step S15) in this embodiment, the real time supervisory flag 31 is returned to "1" (at step S16), and the release of the issue suppression setting is performed from the communication portion 2 to all of the transmitting devices NE's in the NE management table 42 (at step S17), so that the read command of the state change (120 in FIG. 1) is transmitted only to the transmitting device whose notification flag is "1" in the NE management table 42 (at step S18).

Figure 13:
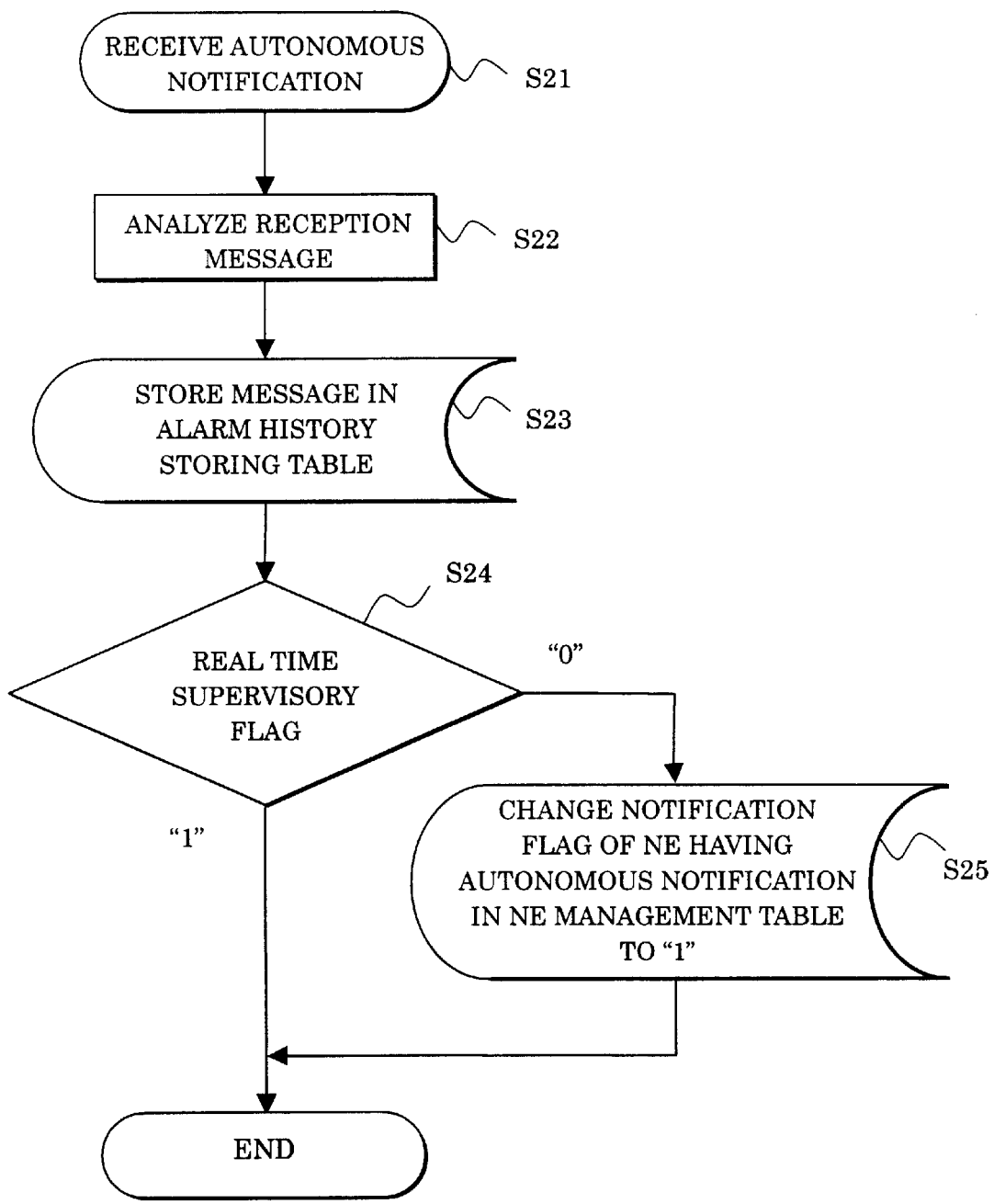
FIG. 13 is a flow chart at the time when an upper supervisory control terminal receives an autonomous notification from each transmitting device in the principle [1] of a supervisory control system according to the present invention.

FIG. 13 shows a processing flow chart at the time when the upper supervisory control terminal OPS receives an autonomous notification from a transmitting device NE. Namely, when the upper supervisory control terminal OPS receives an autonomous notification from a transmitting device NE (at step S21), the transmitting device is analyzed (at step S22), the autonomous notification is stored in the alarm history storing table 41 (at step S23), and then the supervisory state of its own (upper supervisory control terminal OPS) is determined from the value of the real time supervisory flag 31 (at step S24).

As a result, when the real time supervisory state S1="1", the value "1" is stored in the alarm history storing table 41 as it is. When the non-real time supervisory state S2="0", the notification flag in the NE management table 42 is changed to "1" (at step S25) so as to distinguish the transmitting device NE having notified the state change, so that the notification flag is stored in the alarm history storing table 41.

This indicates the state of storing the following notifications in the alarm history storing table 41; The notification (108 in FIG. 1) of generating the alarm A in the transmitting device NE1 in FIG. 1, the notification (110 in FIG. 1) of generating the alarm B in the transmitting device NE2, and the notification (109 in FIG. 1) of recovering the alarm G in the transmitting device NE4.

Hereinafter, the operation of the transmitting device NE will be described.

Figure 14:
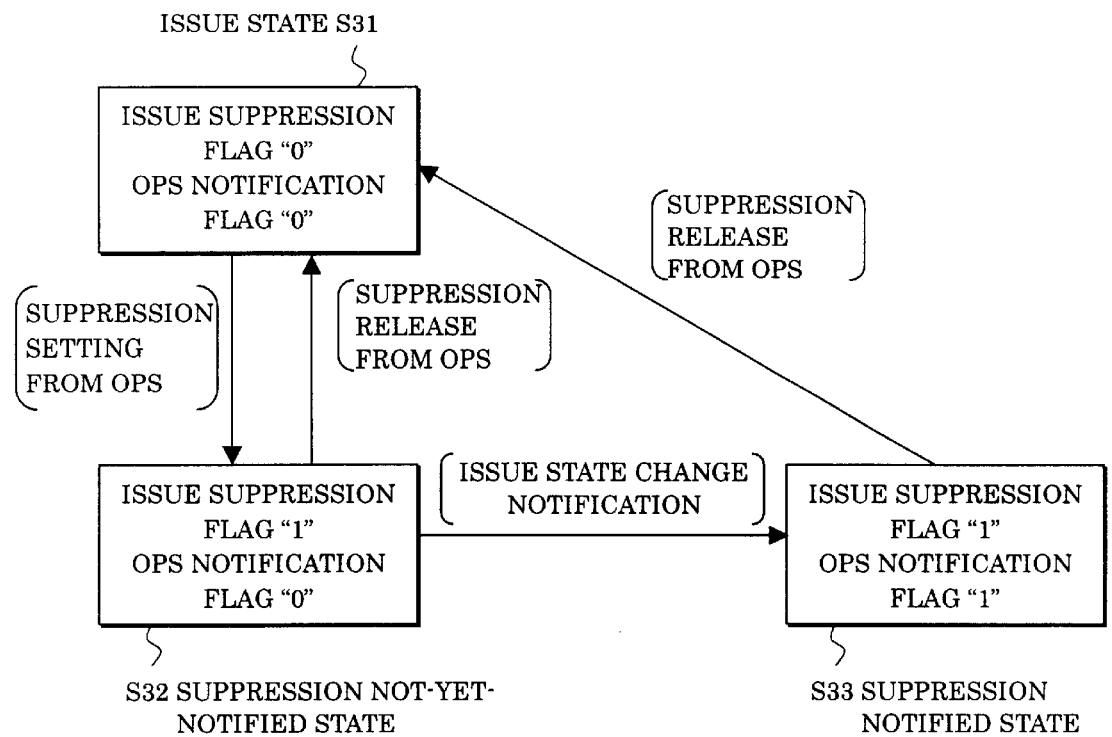
FIG. 14 is a state transition diagram of each transmitting device in the principle [1] of a supervisory control system according to the present invention.

As shown in FIG. 14, each transmitting device NE is switched over among three types of states by the issue suppression flag 51 and the OPS notification flag 52. The issue suppression flag 51 is changed by the issue suppression setting (107 in FIG. 1) and its release (119 in FIG. 1) from the upper supervisory control terminal OPS. Also, the OPS notification flag 52 is switched over when the notification is issued to the upper supervisory control terminal OPS in the issue suppression state.

Namely, although both flags 51 and 52 are "0" in an issue state S31, the state assumes a suppression not-yet-notified state S32 with the issue suppression flag 51 being changed to "1" by the suppression setting (107 in FIG. 1) from the upper supervisory control terminal OPS. If the state change notifications (108–110) are issued under this state, the OPS notification flag 52 assumes "1" and the state assumes the suppression notified state (at step S33). In these states S32 and S33, the suppression release (119 in FIG. 1) from the upper supervisory control terminal OPS is received, so that both flags 51 and 52 are returned to "0".

Figure 15:
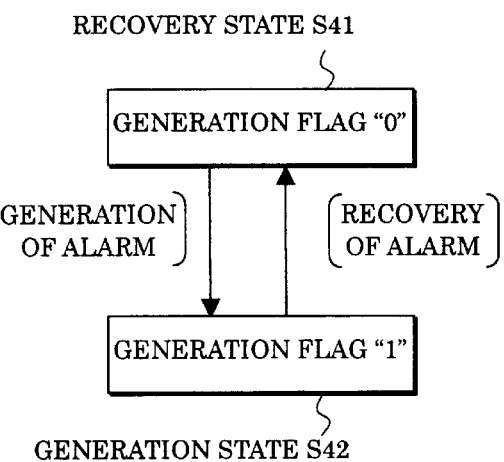
FIG. 15 is a state transition diagram of a generation flag in an alarm management table.

FIG. 15 shows a transition state of a generation flag in the alarm management table 81 provided in the database 8. The value of this generation flag is changed according to the alarm state detected by the state detector 7. Namely, when the concerned alarm is generated, the value changes from "0" to "1" (generation state S42). When the alarm is recovered, the value returns from "1" to "0" (recovery state S41).

Figure 16:
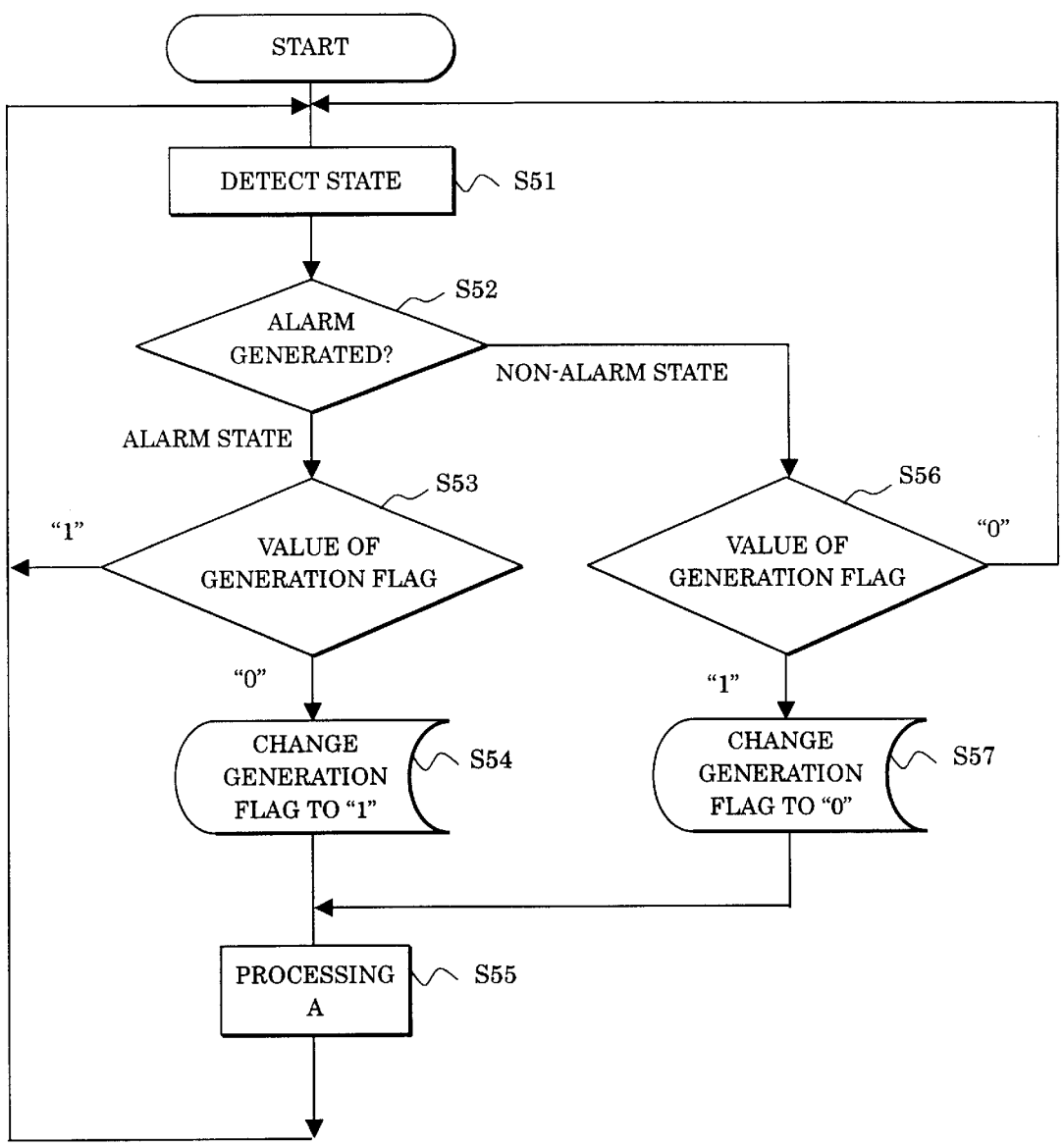
FIG. 16 is a flow chart for detecting a state of each transmitting device.

FIG. 16 shows a flow chart at the time when each transmitting device NE has detected an alarm. Each transmitting device NE detects an alarm state by the state detector 7 at a fixed cycle (at steps S51 and S52), so that whether or not the state detected by the state detector 7 and the value of the generation flag in the alarm management table 81 are coincident with each other is compared (at steps S53 and S56).

As a result, if both are coincident with each other, the transmitting device NE just returns to the alarm detection cycle (steps S51 and S52). If both are not coincident with each other, the transmitting device NE changes the value of the generation flag (at steps S54 and S57) to shift to a processing A in the presence of a state transition (at step S55).

Figure 17:
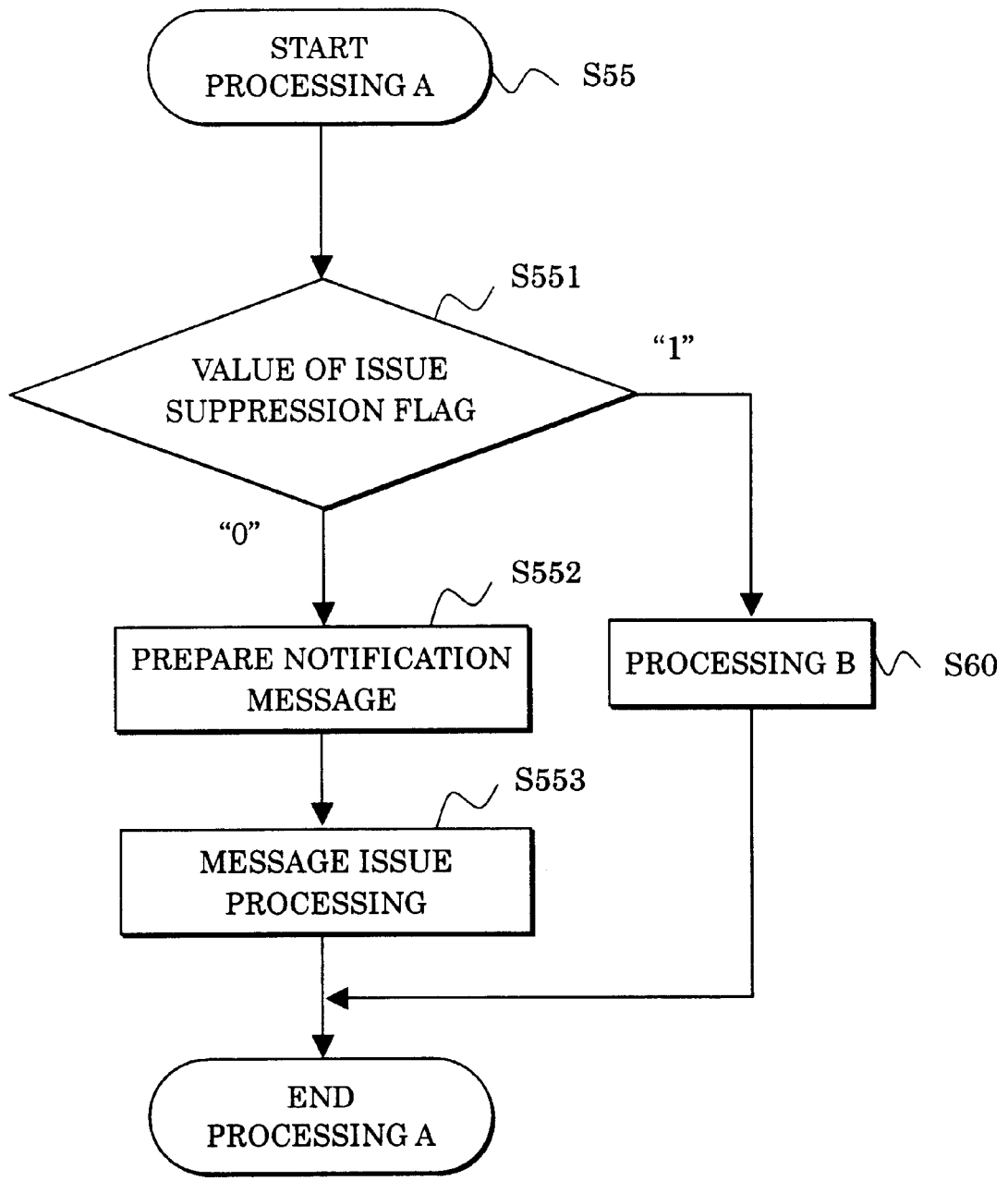
FIG. 17 is a flow chart at the time when each transmitting device detects a state change in the principle [1] of a supervisory control system according to the present invention.

FIG. 17 shows a flow chart of the processing A (at step S55) at the time when each transmitting device NE detects a state transition. In the presence of such a state transition, the transmitting device NE determines whether or not the transmitting device NE itself has entered an issue suppression state is determined from the value of the issue suppression flag 51 (at step S551).

As a result, if not being in the issue suppression state (flag="0"), the transmitting device NE just performs a processing of issuing a state change notification detected (at steps S552 and S553), and returns to the cycle of the alarm detection. In case of an issue suppression state (flag="1"), the transmitting device NE shifts to a processing B (at step S58) in the issue suppression state.

Figure 18:
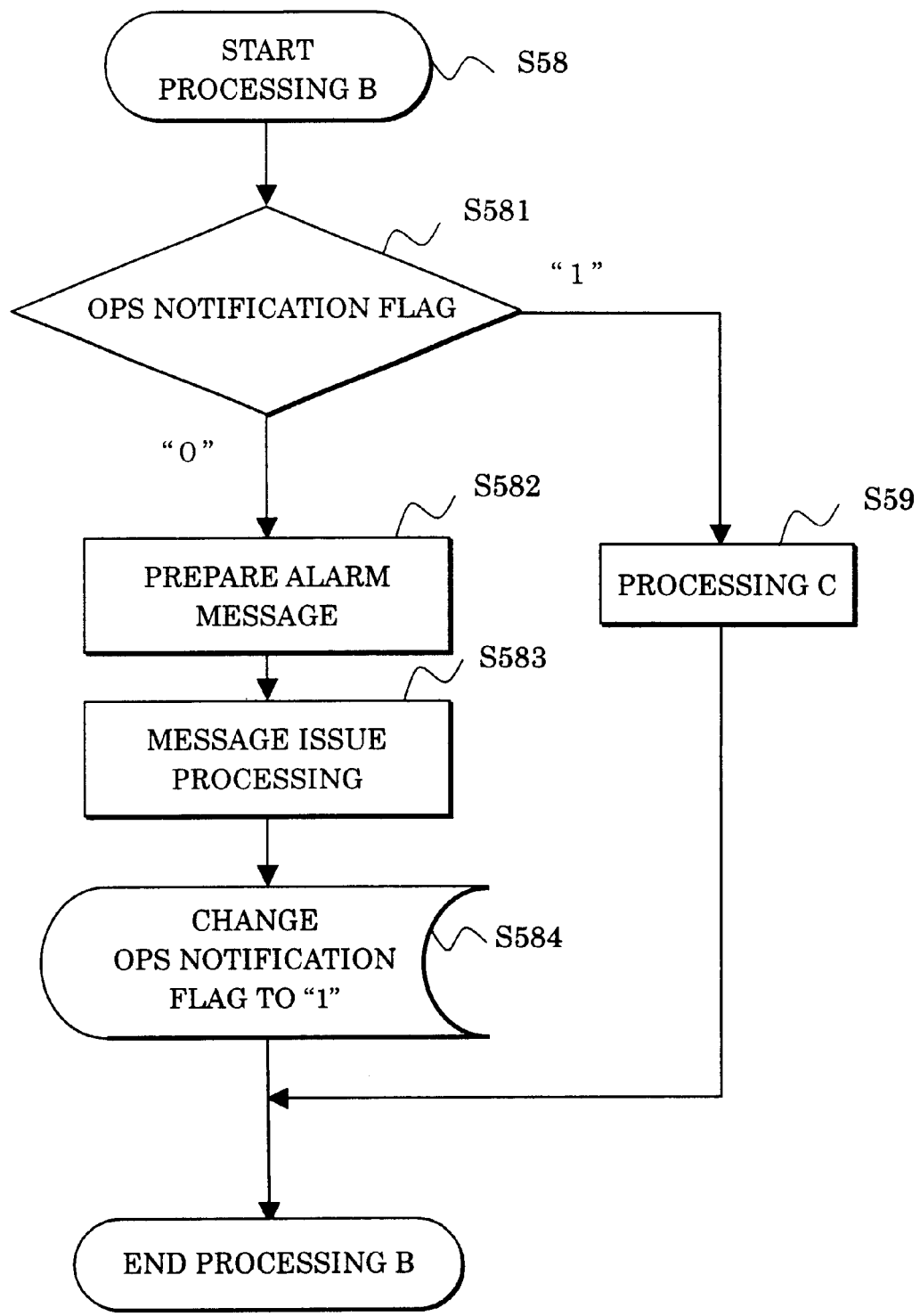
FIG. 18 is a flow chart at the time when a transmitting device detects a state change, and an issue suppression is set in the transmitting device in the principle [1] of a supervisory control system according to the present invention.

FIG. 18 shows the processing B in the issue suppression state. In the processing B, it is shown that the transmitting device NE is already in the issue suppression state, and whether or not the notification is given to the upper supervisory control terminal OPS since the transmitting device NE has entered the issue suppression state is determined with the OPS notification flag 52 (at step S581).

As a result, when recognizing that the transmitting device has never notified the state change (flag="0"), the process of issuing the state change notification is performed (at steps S582 and S583), and the value of the OPS notification flag 52 is changed to "1". On the other hand, when recognizing that the transmitting device has already notified (flag="1"), no state change notification is issued and the routine shifts to a state change storing processing C (at step S59).

Figure 19:
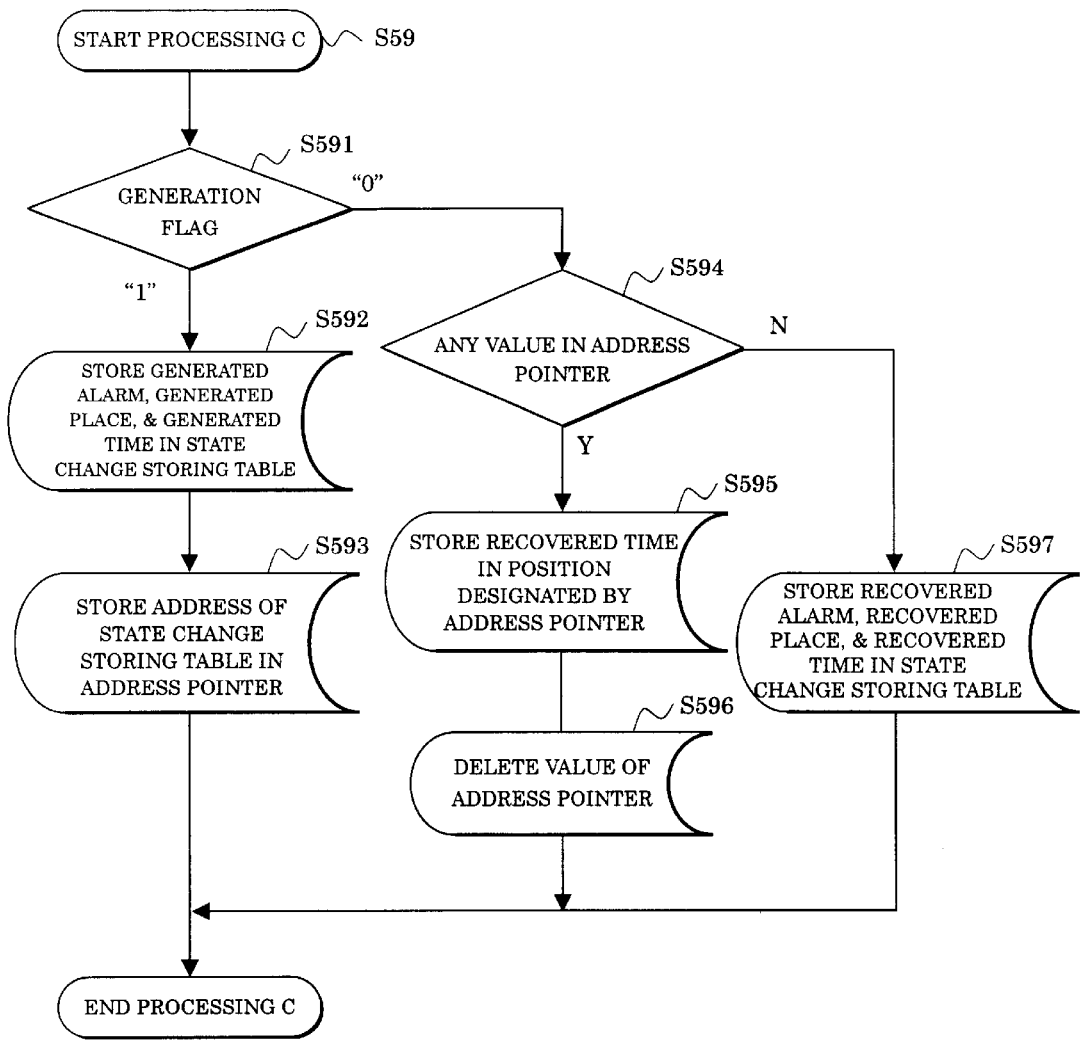

FIG. 19 shows a flow chart of the processing C (at step S59) shown in FIG. 18. When the state change is stored, whether the alarm generation or the alarm recovery is determined from the value of the generation flag (at step S591). In the former case (flag="1"), the generated alarm, the generated place, and the generated time are added to the state change storing table 82 (at step S592). The address added in order to add the recovered time is stored in the address pointer of the alarm management table 81 (at step S593). In the latter case (flag="0"), whether or not the alarm generation is stored in the state change storing table 82 is determined from the address pointer of the alarm management table 81 (step S594).

As a result, in the absence of a value of the address pointer, the recovered alarm, the recovered place, and the recovery time are added to the state change storing table 82, since the generation notification has been already notified to the upper supervisory control terminal OPS (at step S597).

In the presence of a value of the address pointer, the recovered time of the state change storing table 81 designated by the address pointer is added (at step S595), so that the address pointer value of the alarm management table 81 is deleted (at step S596).

Figure 20:
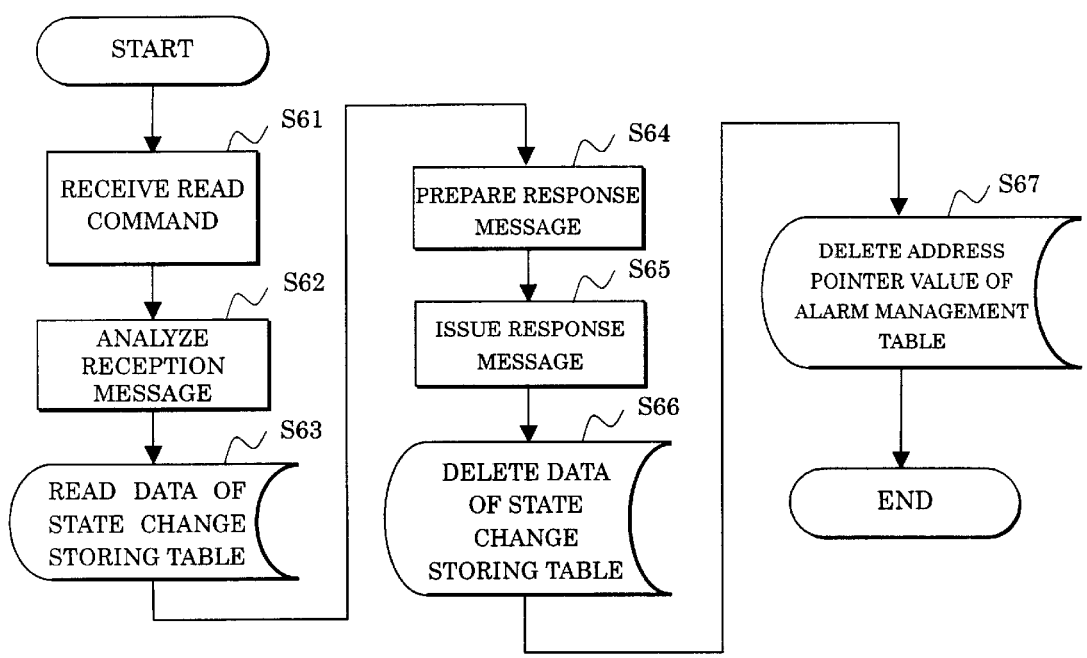
FIG. 20 is a flow chart showing a processing at the time when each transmitting device receives a read command.

FIG. 20 shows a flow chart at the time when each transmitting device NE receives the state read notification (120 in FIG. 1) from the upper supervisory control terminal OPS. When the transmitting device NE receives the state change read notification from the upper supervisory control terminal OPS (steps S61 and S62), the transmitting device NE reads the data stored in the state change storing table 82

(at step S63) to be notified to the upper supervisory control terminal OPS in the form of a single message (steps S64 and S65).

After this notification, the transmitting device NE deletes the data of the state change storing table 82 and the value of the address pointer in the alarm management table 81, so that the processing is ended (at steps S66 and S67).

Figure 2:
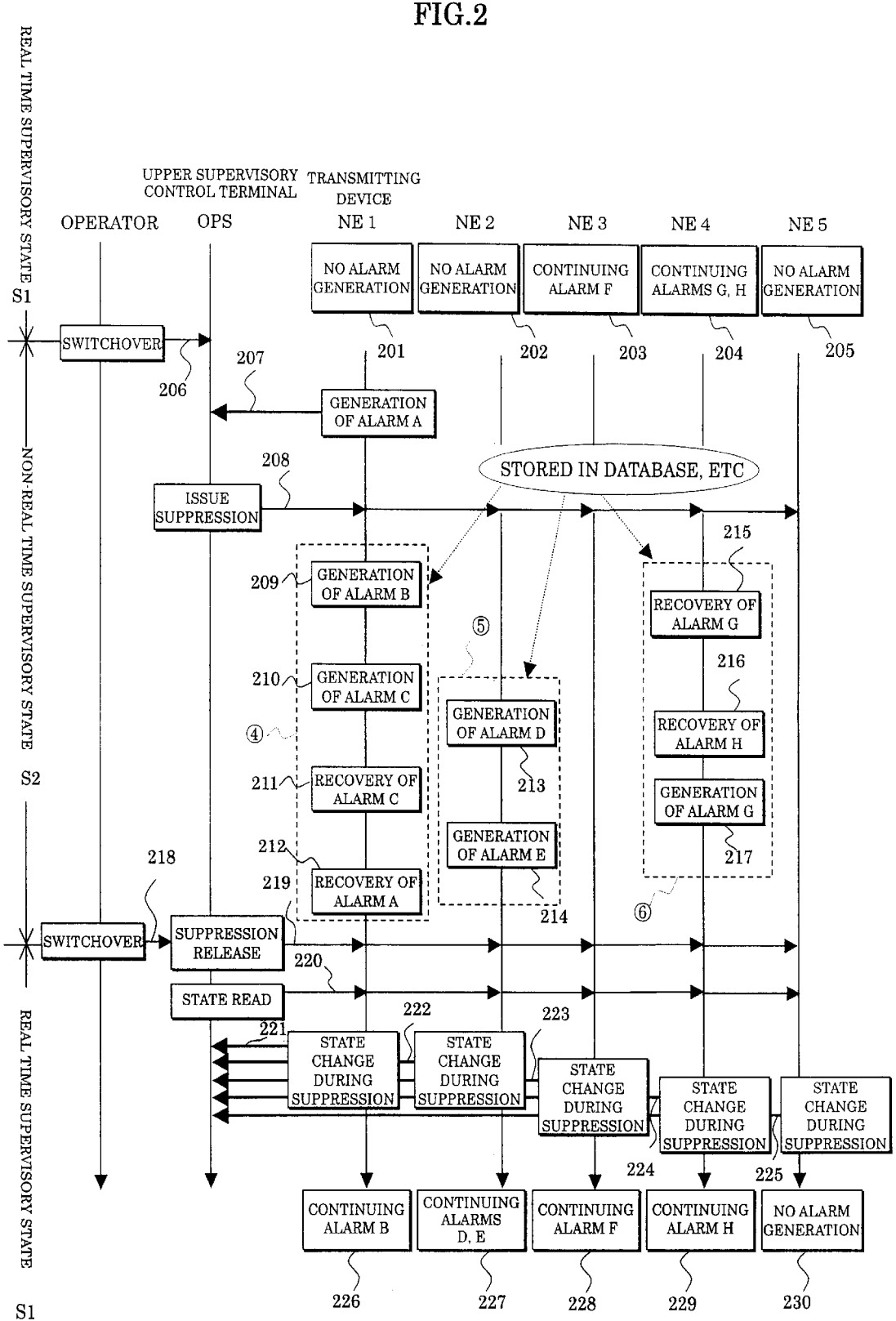
FIG. 2 is a sequence diagram for illustrating a principle [2] of a supervisory control system according to the present invention.
Figures 21, 22:
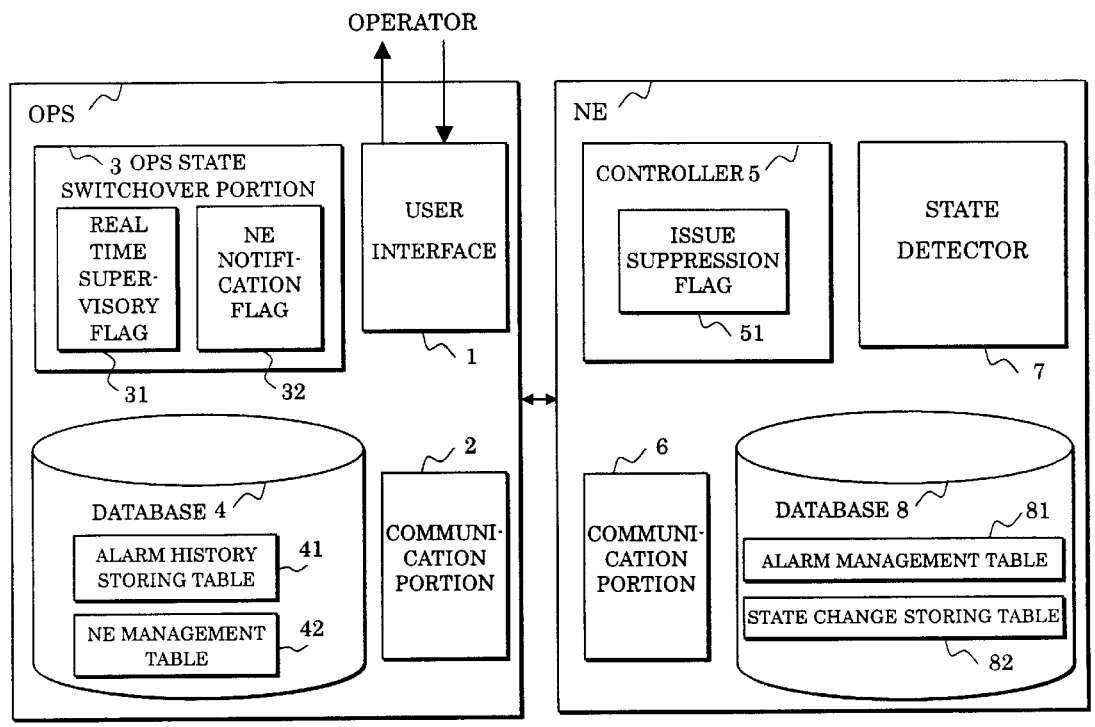
FIG. 21 is a block diagram showing an embodiment of the principle [2] of a supervisory control system according to the present invention.
FIG. 22 is a diagram showing an embodiment of an NE management table used in FIG. 21.

FIG. 21 shows an embodiment for realizing a principle [2] of a supervisory control system according to the present invention shown in FIG. 2. This embodiment is characterized by that an NE notification flag 32 is added to the OPS state switchover portion 3, and this flag 32 controls the supervisory state of the upper supervisory control terminal.

FIG. 22 shows an embodiment of the NE management table 42 shown in FIG. 21. The NE management table 42 in this case manages all of the transmitting devices NE's supervised by the upper supervisory control terminal OPS, and does not use the notification flag, different from the case of FIG. 7.

Also in the embodiment shown in FIG. 21, different from the embodiment of FIG. 5, the controller 5 of each transmitting device NE does not use the OPS notification flag 52, and controls the autonomous notification only with the issue suppression flag 51.

The operation of this embodiment will now be described referring to FIGS. 2 and 23–27.

First, the upper supervisory control terminal OPS will be described.

Figure 23:
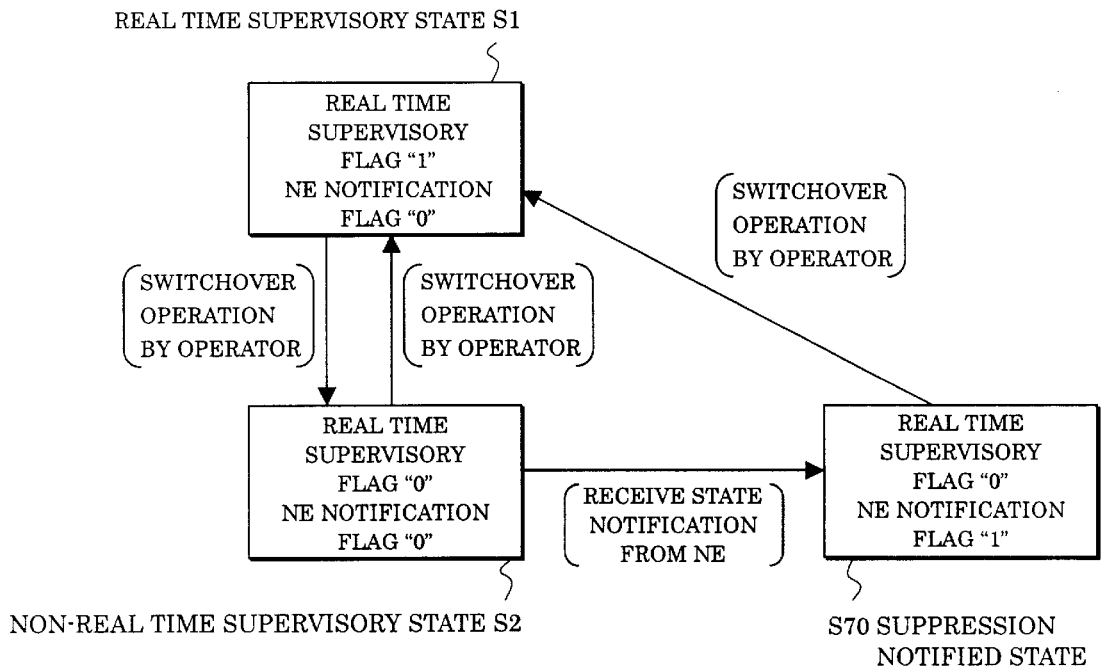
FIG. 23 is a state transition diagram of an upper supervisory control terminal in the principle [2] of a supervisory control system according to the present invention.

FIG. 23 shows a state transition of the upper supervisory control terminal OPS in the embodiment shown in FIG. 21. The upper supervisory control terminal OPS is switched over among three states; the real time supervisory state S1, the non-real time supervisory state S2, and a suppression notified state S70, with the real time supervisory flag 31 and the NE notification flag 30.

The real time supervisory flag 31 is changed, in the same way as the embodiment of FIG. 5, by a manual operation through the user interface 1. The NE notification flag 32 is switched over from "0" to "1", only when the upper supervisory control terminal OPS is in the non-real time supervisory state S2 and receives the state change notification (suppression notified state S70) from any transmitting device NE within the supervisory network.

Figure 24:
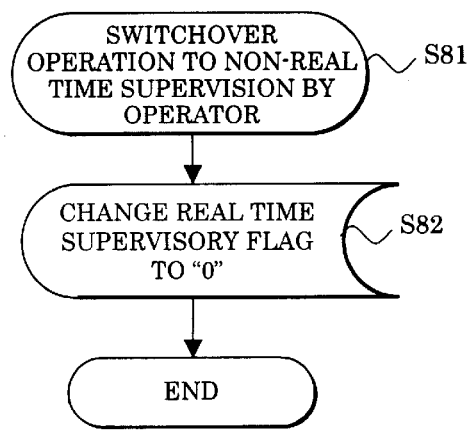
FIG. 24 is a flow chart (1) at the time when an operator performs a switchover operation in the principle [2] of a supervisory control system according to the present invention.

FIG. 24 shows a processing flow of the upper supervisory control terminal OPS at the time of the switchover operation (206 in FIG. 2) by the operator. When the upper supervisory control terminal OPS switches over from the real time supervisory state S1 to the non-real time supervisory state S2 (at step S81) by the operation of the operator, the real time supervisory flag 31 is changed to "0" to end the processing.

Figure 25:
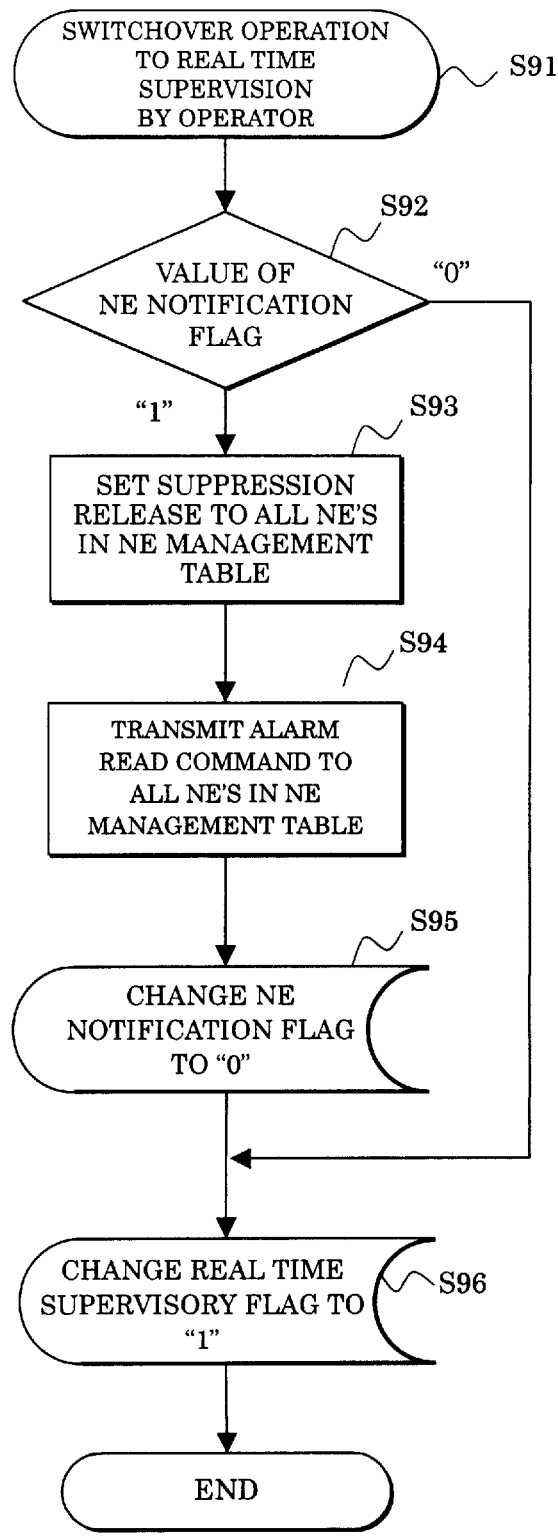
FIG. 25 is a flow chart (2) at the time when an operator performs a switchover operation in the principle [2] of a supervisory control system according to the present invention.

On the other hand, when returning to the real time supervisory state S2 by the manual operation (at step S91), as shown in FIG. 25, whether or not the notification is given from each transmitting device NE within the supervisory network is determined from the value of the NE notification flag 32 (at step S92).

When the NE notification flag is "0", there has been found to be no state change within the supervisory network, so that the real time supervisory flag 31 is changed to "1" (at step S96) to end the processing.

When the NE notification flag 32 is "1", the communication portion 2 performs the suppression release setting (219 in FIG. 2) to all of the transmitting devices NE's in the NE management table 42, so that the read command (220 in FIG. 2) of the state change is transmitted (at steps S93 and S94).

Then, the NE notification flag 32 is changed to "0", and the real time supervisory flag 31 is changed to "1" (at steps S95 and S96), so that the processing is ended.

Figure 26:
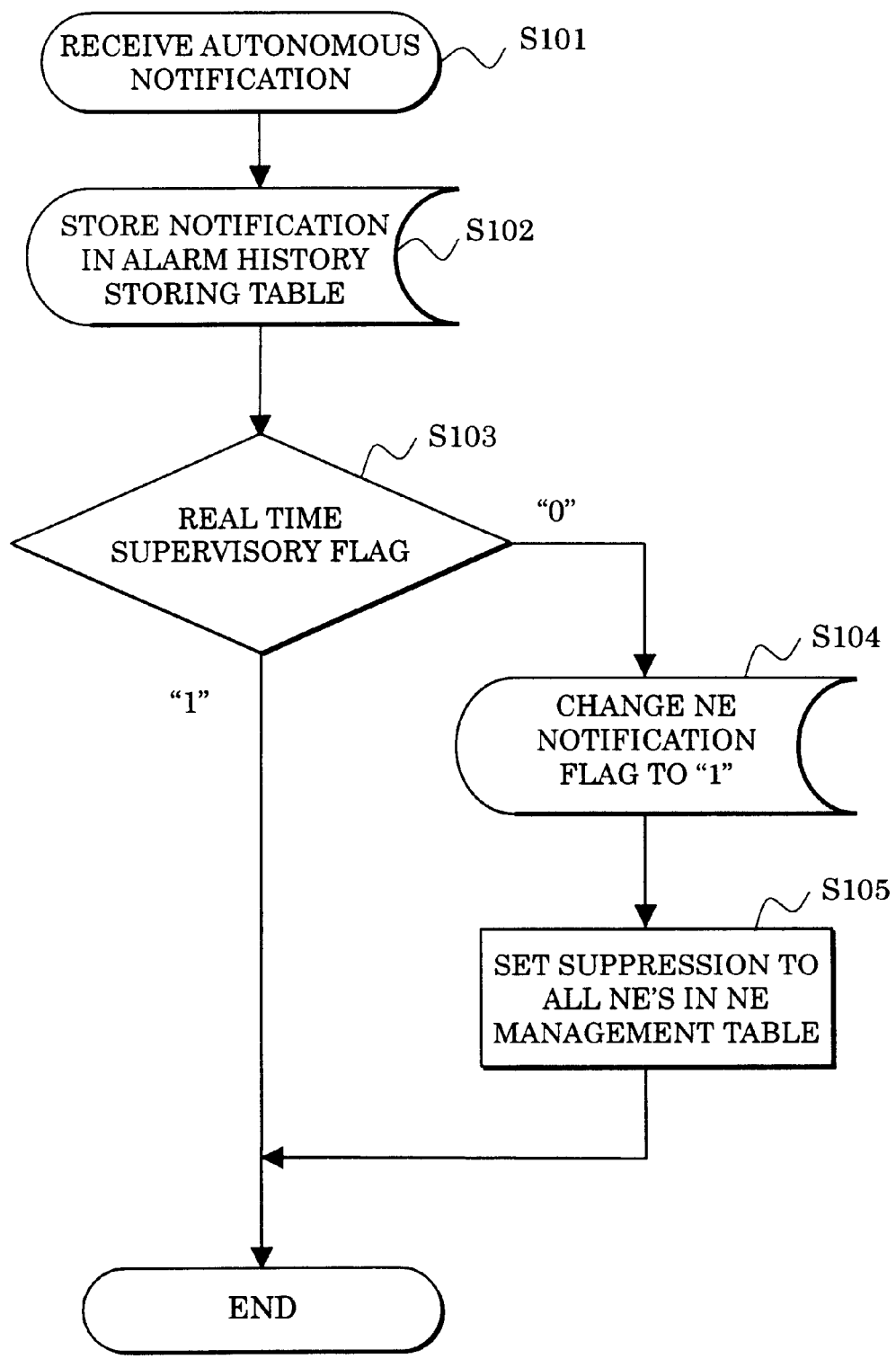
FIG. 26 is a flow chart at the time when an upper supervisory control terminal receives an autonomous notification from each transmitting device in the principle [2] of a supervisory control system according to the present invention.

FIG. 26 shows a processing flow at the time when the upper supervisory control terminal OPS receives an autonomous notification (207 in FIG. 2) from the transmitting device NE. When the upper supervisory control terminal OPS receives the autonomous notification from the transmitting device NE (at step S101), the notified message is firstly stored in the alarm history storing table 41 (at step S102), and then the upper supervisory control terminal OPS state is determined from the value of the real time supervisory flag 31 (at step S103).

As a result, under the real time supervisory state S1 (flag="1"), the processing is ended as it is. Under the non-real time supervisory state S2 (flag="0"), the NE notification flag 32 is changed to "1" (at step S104), so that the issue suppression setting is performed to all of the transmitting devices in the NE management table 42 (at step S105).

The operation of the transmitting device NE in FIG. 21 will now be described.

Each transmitting device NE is switched over between the issue state and the suppression state of the state change notification by the issue suppression flag 51. The issue suppression flag 51 is changed by the suppression setting (208 in FIG. 2) and the release setting (219 in FIG. 2) from the upper supervisory control terminal OPS. The value is changed by the alarm state detected by the state detector 7. When the concerned alarm is generated, the value is changed from "0" to "1", and when the alarm is recovered, the value returns from "1" to "0".

Figure 27:
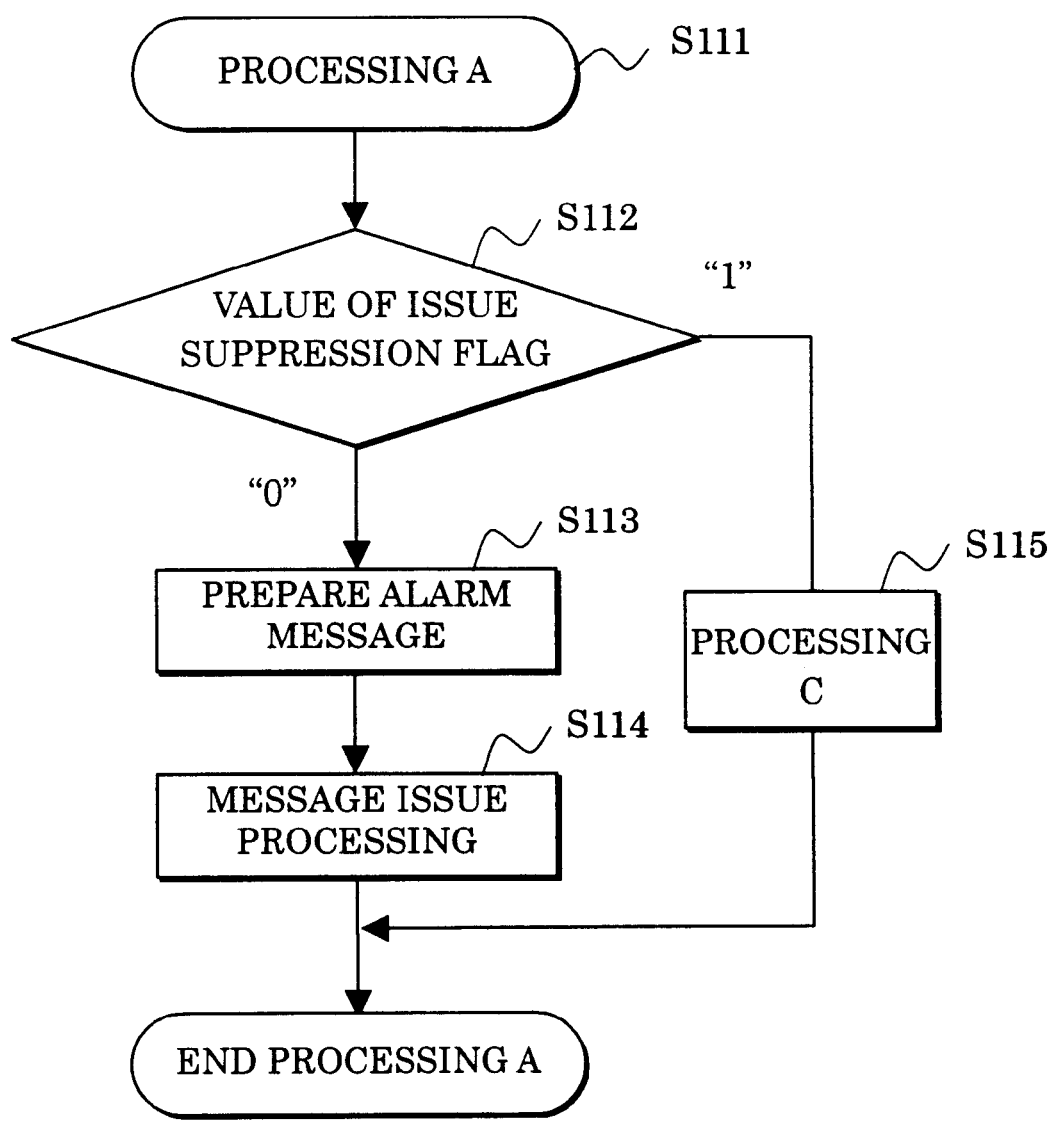
FIG. 27 is a flow chart at the time when each transmitting device detects a state change in the principle [2] of a supervisory control system according to the present invention.

The cycle for detecting the state change of each transmitting device is the same as the processing (FIG. 16) of the embodiment in FIG. 5, and the processing A at the time when there is a state transition is shown in FIG. 27.

In the presence of a state transition (processing A: at step S111), whether the transmitting device NE is in the issue state or the issue suppression state is determined by the value of the issue suppression flag 51 of the transmitting device NE (at step S112). As a result, if being in the issue state (flag="0"), the transmitting device NE issues the detected state change notification as it is (at steps S113 and S114), returning to the detection cycle of the state change.

On the other hand, if being in the issue suppression state (flag="1"), the transmitting device NE shifts to the processing C (at step S115) of storing the state change.

The processing C at the time when there is a state change is the same as the embodiment of FIG. 5. When receiving the state change read notification from the upper supervisory control terminal OPS (220 in FIG. 2), each transmitting device NE, in the same way as the embodiment of FIG. 5, reads the data stored in the storing table 82, merges the data as a single message, and notifies the message to the upper supervisory control terminal OPS. After the notification, the transmitting device NE deletes the data of the state change table 82 and the value of the address pointer in the alarm management table 81, so that the processing is ended.

Figure 3:
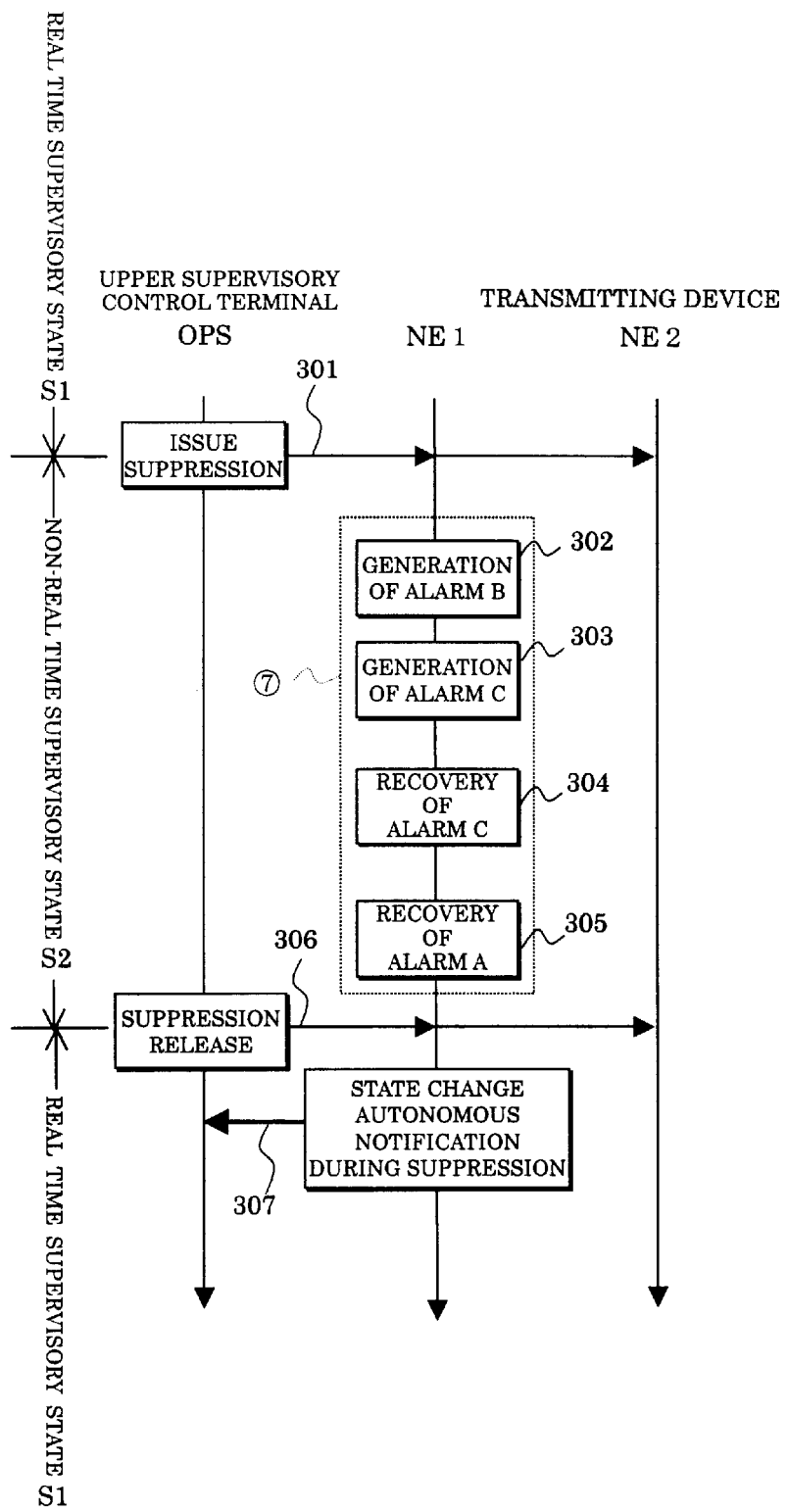
FIG. 3 is a sequence diagram for illustrating a principle [3] of a supervisory control system according to the present invention.

An embodiment of a principle [3] of a supervisory control system according to the present invention shown in FIG. 3 will now be described.

For the arrangement of the upper supervisory control terminal OPS and each transmitting device NE in this case, the arrangements of FIGS. 5 and 21 can be used. However, the processing of transmitting the state read notification is not performed to the transmitting device NE. Also, the processing from the state detection of the transmitting device NE to the notification storing is the same as that of the above-mentioned embodiments.

Figures 28, 29:
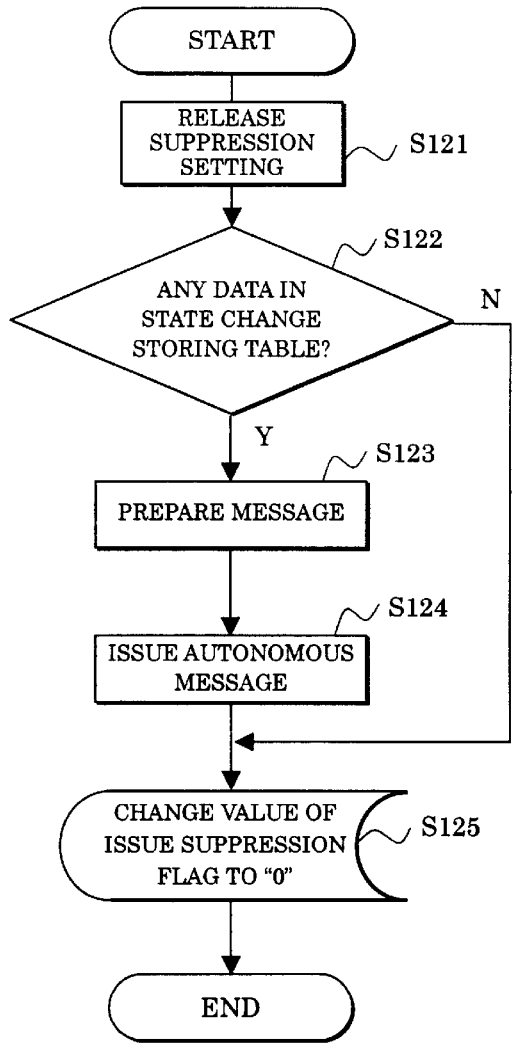
FIG. 28 is a flow chart at the time when each transmitting device receives a suppression release message in the principle [3] of a supervisory control system according to the present invention.
FIG. 29 is a diagram showing an embodiment of a state change storing table used in the principle [4] of a supervisory control system according to the present invention.

FIG. 28 shows a flow chart at the time when each transmitting device NE releases (306 in FIG. 3) the suppression setting (301 in FIG. 3) by this embodiment.

When the suppression setting is released (at step S121), it is determined whether or not there are data in the state change storing table 82 (at step S122). If there are no data, the value of the issue suppression flag 51 is changed to "0" (at step S125), so that the processing is ended. If there are data, the stored message is transmitted (at steps S123 and 124), so that the issue suppression flag 51 is changed (at step S125).

Figure 4:
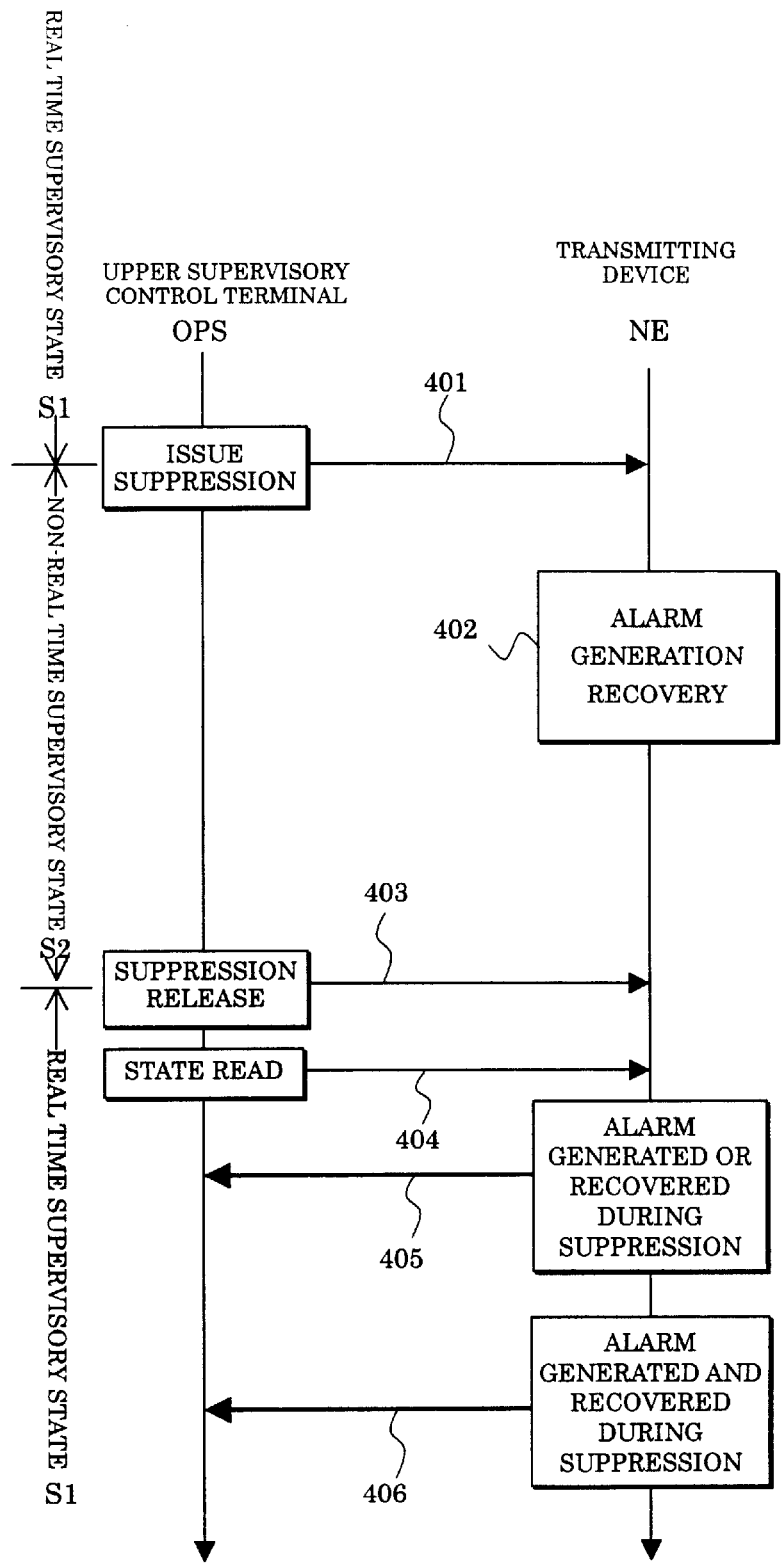
FIG. 4 is a sequence diagram for illustrating a principle [4] of a supervisory control system according to the present invention.

An embodiment of a principle [4] of the supervisory control system according to the present invention shown in FIG. 4 will now be described.

In this embodiment, the arrangement of the state change storing table 82 is different from that of the above-mentioned embodiments. Namely, as shown in FIG. 29, the state change storing table 82 is composed of an address, a generated alarm type, a generated position, a generated date & time, a recovered date & time, and a priority flag.

Figure 30:
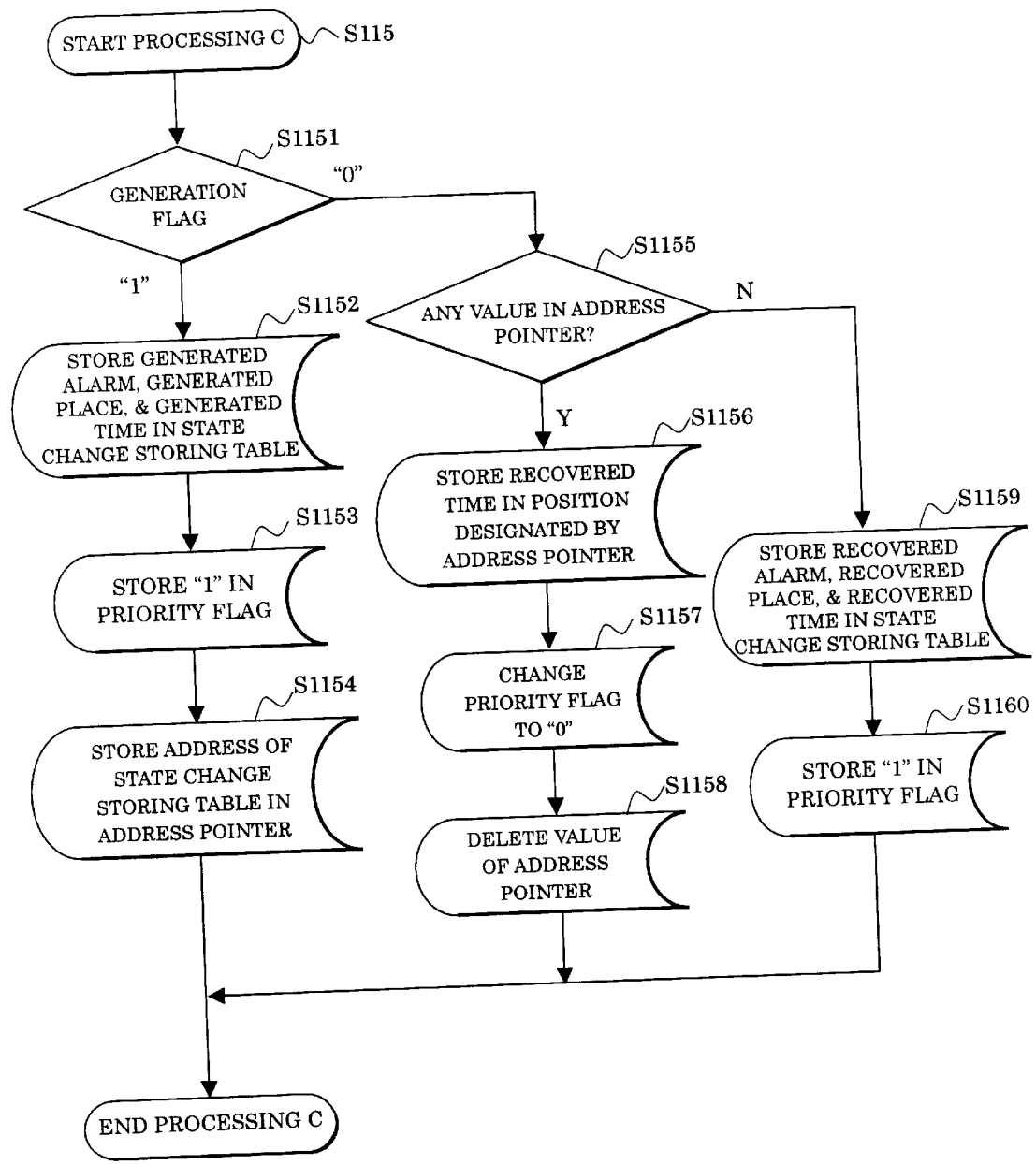
FIG. 30 is a flow chart at the time when data are stored in a state change storing table in the principle [4] of a supervisory control system according to the present invention.

FIG. 30 shows a flow chart of the processing C (at step S115) for storing the state change by this embodiment. First, in this processing C, whether it is the alarm generation or the alarm recovery is determined from the value of the generation flag (at step S1151).

As a result, if it is determined to be "generation" (flag="1"), the generated alarm, the generated place, and the generated time are added to the state change storing table 82 (at step S1152), and "1" is stored in the priority flag (at step S1153). In order that the recovered time can be added, the added address is stored in the address pointer of the alarm management table 81 (at step S1154).

If it is determined to be "recovery" (flag="0") at step S1151, it is determined whether or not the alarm generation is stored in the state change storing table 82 from the address pointer of the alarm management table 81 (at step S1155).

As a result, the absence of the value of the address pointer indicates that the generation notification has been already notified to the upper supervisory control terminal OPS. Therefore, the recovered alarm, the recovered place, and the recovered time are added in the state change storing table 82 (at step S1159), and "1" is stored in the priority flag (at step S1160).

The presence of a value of the address pointer indicates that the recovered time of the state change storing table 82 designated by the address pointer is added (at step S1156), and the priority flag is changed to "0" (at step S1157), so that the value of the address pointer in the alarm management table 81 is deleted (at step S1158).

Figure 31:
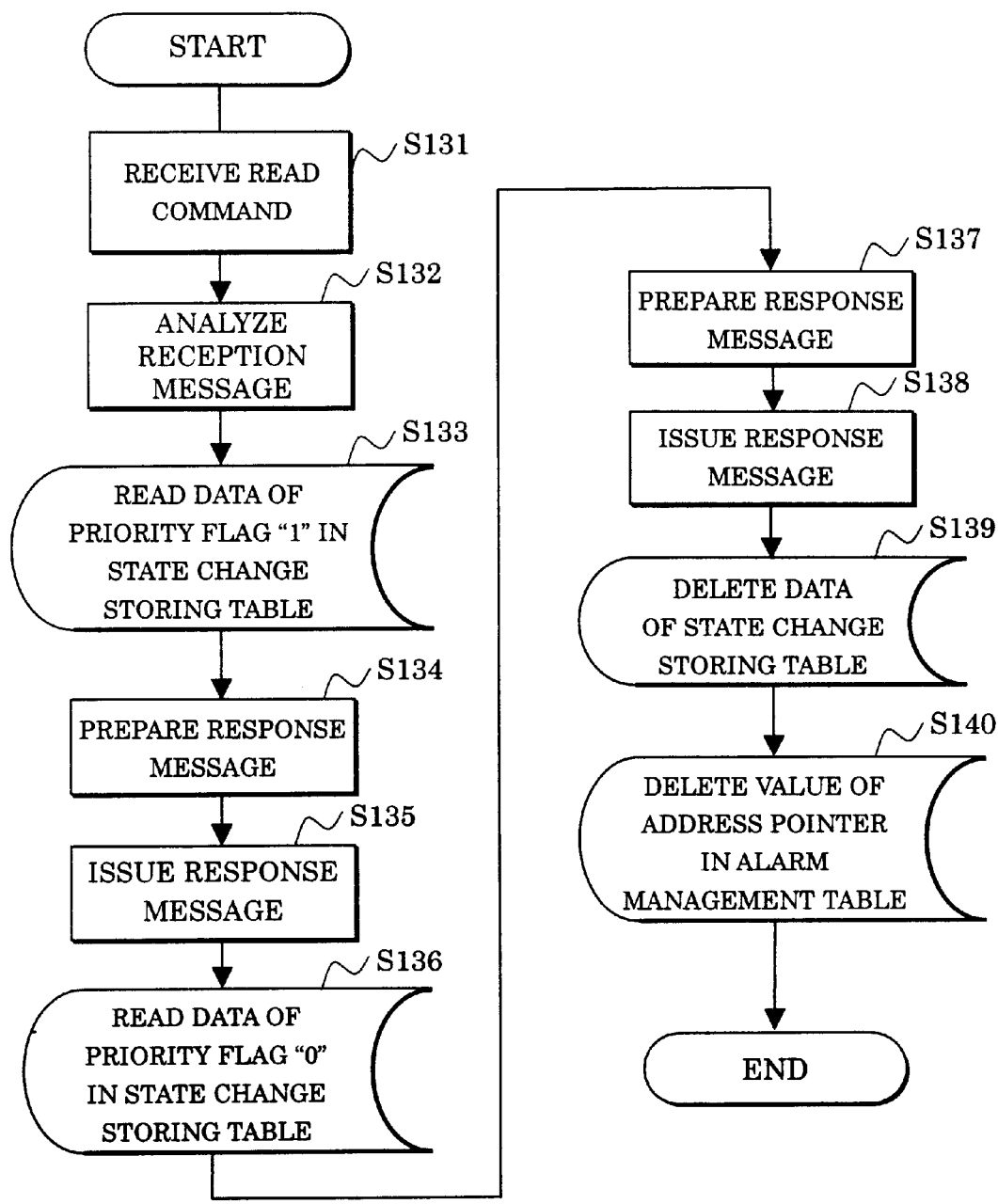
FIG. 31 is a flow chart at the time when a transmitting device responds to a read command in the principle [4] of a supervisory control system according to the present invention.
Figure 32:
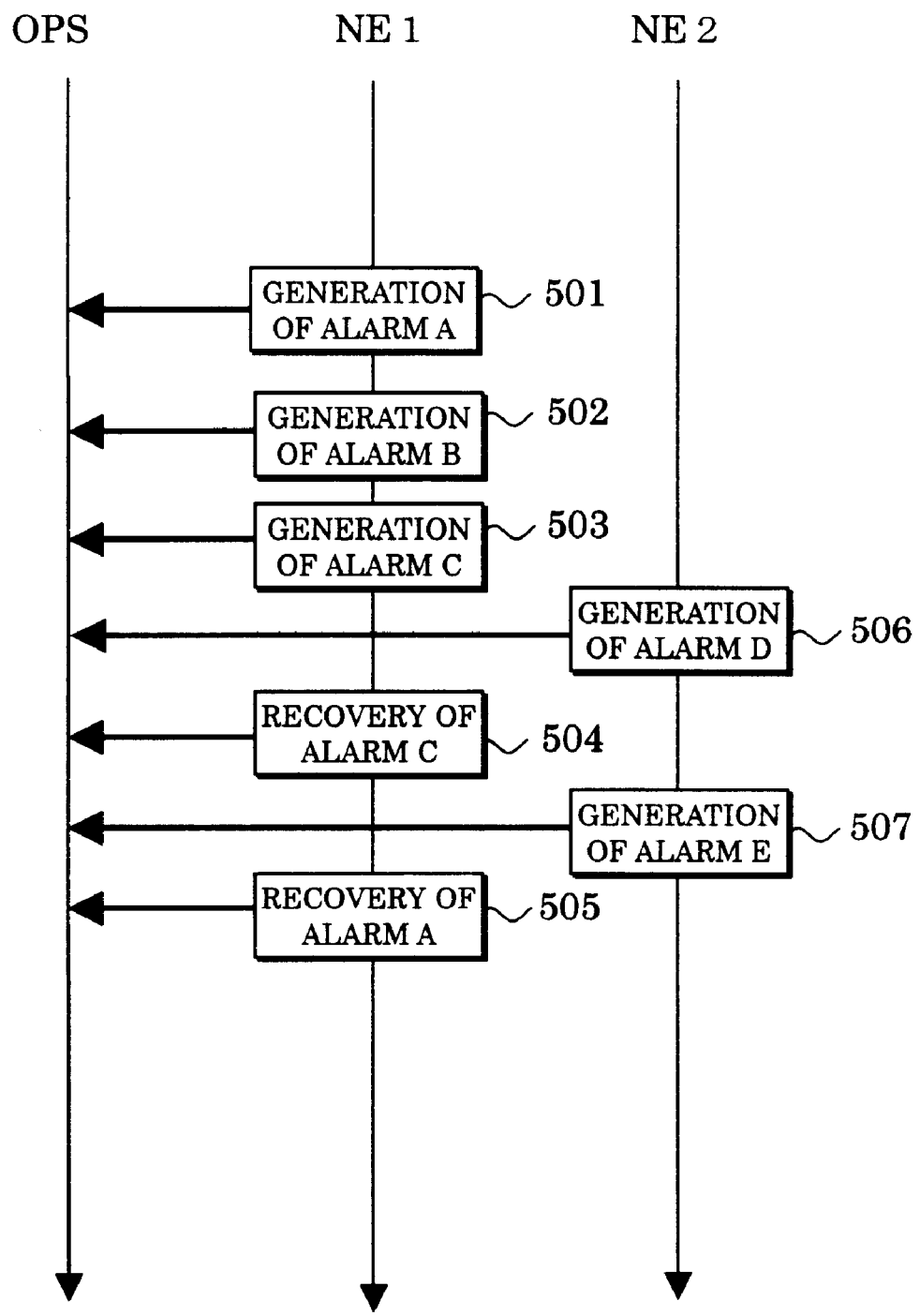
FIG. 32 is a sequence diagram showing an operation example (1) of a prior art supervisory control system.
Figure 33:
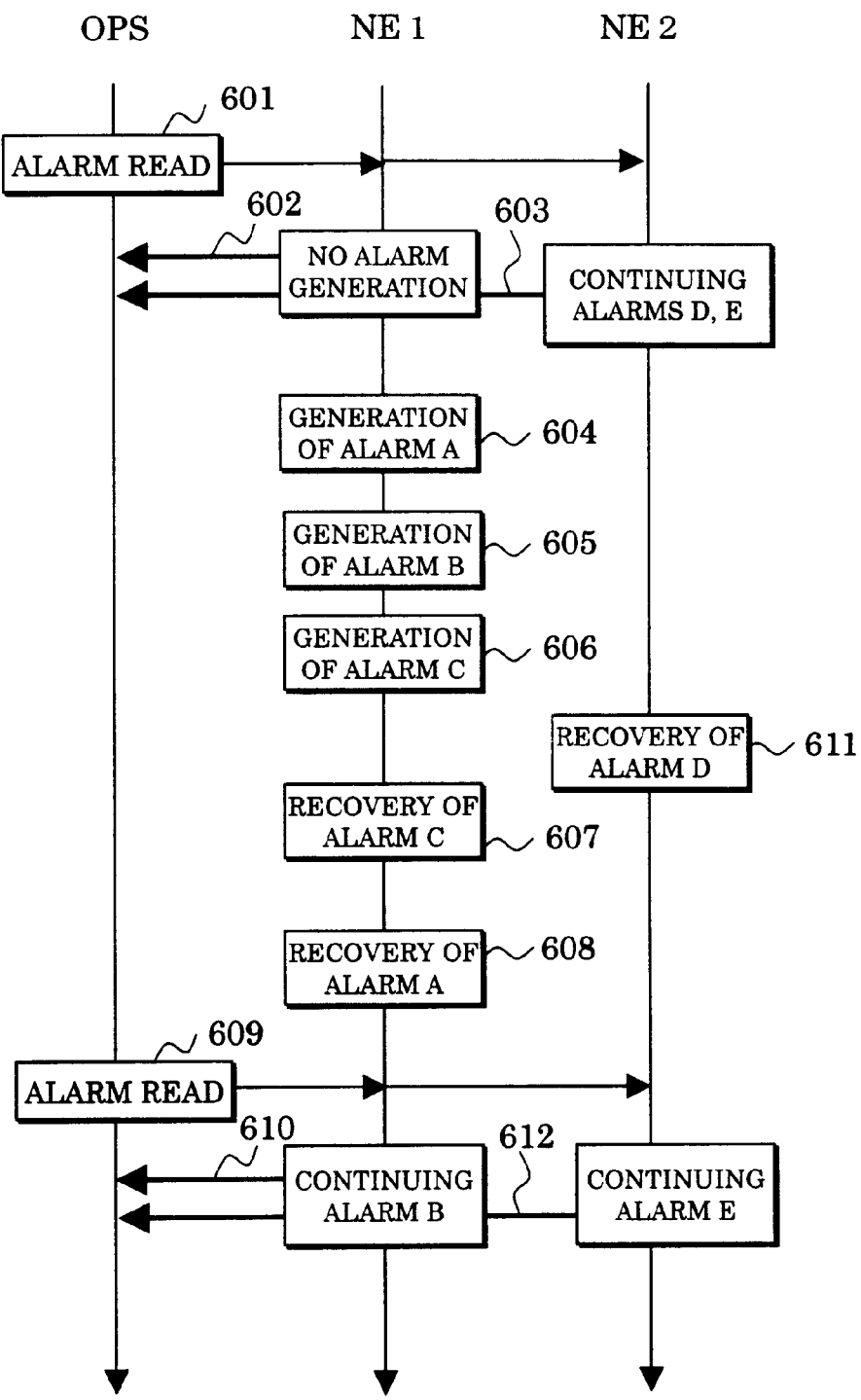
FIG. 33 is a sequence diagram showing an operation example (2) of a prior art supervisory control system.

FIG. 31 shows a flow chart at the time when each transmitting devices NE receives the state change read notification (404 in FIG. 4) from the upper supervisory control terminal OPS in this embodiment. When receiving the state change read notification from the upper supervisory control terminal OPS (at steps S131 and S132), the transmitting device NE firstly reads the data stored in the state change storing table 82 (at step S133), and prepares a message of data whose priority flag of the state change storing table 82 is "1" and notifies it to the upper supervisory control terminal OPS (at steps S134 and S135).

Then, a message of data whose priority flag is "0" is prepared and notified to the upper supervisory control terminal OPS (steps S136–S138).

After the notification, the transmitting device NE deletes the data of the state change storing table 82 and the value of the address pointer in the alarm management table 81 to end the processing (at steps S139 and S140).

Thus, the notification in the case where the alarm is generated or the alarm is recovered under the non-real time supervisory state is given a high priority, and the notification in the case where the alarm is generated but recovered is given a low priority.

As described above, a supervisory control system according to the present invention is arranged such that an upper supervisory control terminal has two supervisory states, and transmitting devices store state change information to be transmitted to the upper supervisory control terminal with an issue of the information being suppressed when the upper supervisory control terminal is in one supervisory state, and merge the state change information into a single message to be transmitted from the transmitting devices when the upper supervisory control terminal shifts to the other supervisory state. Therefore, it becomes possible to decrease a notification information amount from the transmitting devices to the upper supervisory control terminal, and to avoid a congested state of a communication therebetween when alarms are frequently generated.

Also, since an operator can immediately distinguish a transmitting device in which a state has changed and a transmitting device in which a state has not changed, it becomes possible to promptly deal with a fault of the transmitting device.

What we claim is:

1. A supervisory control system comprising:
    an upper supervisory control terminal, for supervising and controlling transmitting devices, which has two supervisory states,
    the transmitting devices storing state change information to be transmitted to the upper supervisory control terminal when the upper supervisory control terminal is in one supervisory state, and merging the state change information into a single message to be transmitted when the upper supervisory control terminal shifts to the other supervisory state.

2. The supervisory control system as claimed in claim 1 wherein concurrently with an operator switching over the supervisory state of the upper supervisory control terminal, the upper supervisory control terminal performs an issue suppression and an issue release to the transmitting devices for the one supervisory state.

3. The supervisory control system as claimed in claim 2 wherein when the issue suppression is set in the transmitting devices, the transmitting devices only issue a first state change notification.

4. The supervisory control system as claimed in claim 3 wherein when the state change notification is given to the upper supervisory control terminal from the transmitting devices, the upper supervisory control terminal reads the state change information only from the transmitting devices to which the state change notification is given.

5. The supervisory control system as claimed in claim 1 wherein after an operator switches over the supervisory state of the upper supervisory control terminal, the upper supervisory control terminal performs an issue suppression to all of the transmitting devices when first state change information is autonomously received from the transmitting devices.

6. The supervisory control system as claimed in claim 5 wherein the upper supervisory control terminal reads the state change information during an issue suppression period for all of the transmitting devices to be supervised.

7. The supervisory control system as claimed in claim 6 wherein concurrently with the issue suppression to the transmitting devices being released from the upper supervisory control terminal, the transmitting device autonomously notifies the state change information stored during an issue suppression period.

8. The supervisory control system as claimed in claim 1 wherein stored messages are separated according to a priority to be notified.

9. The supervisory control system as claimed in claim 2 wherein the one supervisory state comprises a non-real time supervisory state and the other supervisory state comprises a real time supervisory state.

* * * * *